(12) United States Patent
Chen et al.

(10) Patent No.: US 9,009,441 B2
(45) Date of Patent: Apr. 14, 2015

(54) MEMORY CHANNEL SELECTION IN A MULTI-CHANNEL MEMORY

(75) Inventors: Lin Chen, San Diego, CA (US); Long Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 13/487,813

(22) Filed: Jun. 4, 2012

(65) Prior Publication Data

US 2013/0326158 A1    Dec. 5, 2013

(51) Int. Cl.
*G06F 12/06* (2006.01)
*G06F 9/35* (2006.01)

(52) U.S. Cl.
CPC . *G06F 12/06* (2013.01); *G06F 9/35* (2013.01)

(58) Field of Classification Search
CPC ....... G06F 12/1027; G06F 9/32; G06F 12/06; G06F 9/35
USPC .......................................... 711/202, 206, 220
See application file for complete search history.

(56) References Cited

U.S. PATENT DOCUMENTS

| | | | |
|---|---|---|---|
| 5,982,384 A | 11/1999 | Prouty et al. | |
| 6,041,393 A | 3/2000 | Hsu | |
| 6,374,341 B1 * | 4/2002 | Nijhawan et al. | 711/207 |
| 6,499,095 B1 * | 12/2002 | Sexton et al. | 711/203 |
| 6,850,241 B2 | 2/2005 | Champion | |
| 6,877,076 B1 | 4/2005 | Cho et al. | |
| 7,209,141 B2 | 4/2007 | Garg et al. | |
| 7,418,571 B2 | 8/2008 | Wolrich et al. | |
| 7,558,947 B1 * | 7/2009 | Trivedi et al. | 712/222 |
| 7,681,013 B1 * | 3/2010 | Trivedi et al. | 712/7 |
| 7,872,657 B1 | 1/2011 | Edmondson et al. | |
| 8,072,463 B1 | 12/2011 | Van Dyke et al. | |
| 8,108,648 B2 | 1/2012 | Srinivasan et al. | |
| 2007/0242085 A1 * | 10/2007 | Weybrew et al. | 345/629 |
| 2010/0076941 A1 | 3/2010 | Dotsenko et al. | |
| 2010/0274976 A1 | 10/2010 | Kang et al. | |
| 2011/0292725 A1 | 12/2011 | Choi et al. | |

FOREIGN PATENT DOCUMENTS

EP    2453360 A2    5/2012

OTHER PUBLICATIONS

Habich et al., "Performance engineering for the Lattice Boltzmann method on GPGPUs: Architectural requirements and performance results," Computers & Fluids, Dec. 6, 2011, 10 pp.
U.S. Appl. No. 13/491,452, by Lin Chen, filed on Jun. 7, 2012.

(Continued)

*Primary Examiner* — Than Nguyen
(74) *Attorney, Agent, or Firm* — Shumaker & Sieffert, P.A.

(57) ABSTRACT

In general, this disclosure describes techniques for selecting a memory channel in a multi-channel memory system for storing data, so that usage of the memory channels is well-balanced. A request to write data to a logical memory address of a memory system may be received. The logical memory address may include a logical page number and a page offset, where the logical page number maps to a physical page number and the logical memory address maps to a physical memory address. A memory unit out of a plurality of memory units in the memory system may be determined by performing a logical operation on one or more bits of the page offset and one or more bits of the physical page number. The data may be written to a physical memory address in the determined memory unit in the memory system.

26 Claims, 18 Drawing Sheets

(56) References Cited

OTHER PUBLICATIONS

International Preliminary Report on Patentability—PCT/US2013/038837, The International Bureau of WIPO—Geneva, Switzerland, Jun. 2, 2014, 6 pp.

International Search Report and Written Opinion—PCT/US2013/038837—ISA/EPO, Aug. 20, 2013, 9 pp.

McCormack et al., "Neon: A Single-Chip 3D Workstation Graphics Accelerator," ACM, 2 Penn Plaza, Suite 701—New York, USA, 1998, XP040095898, ACM sections 5.2.3 and 5.2.4; figure 4, 10 pp.

\* cited by examiner

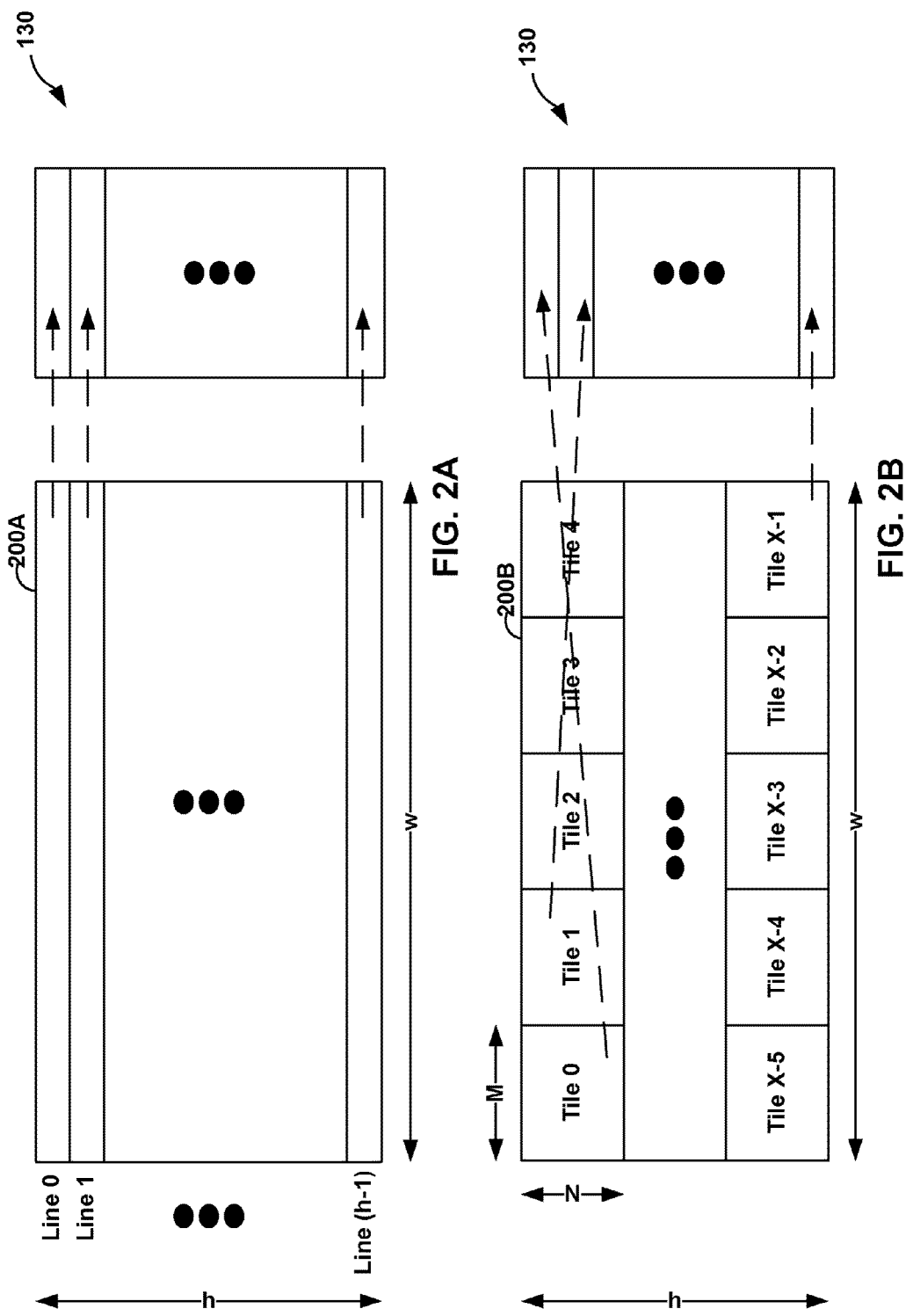

MEMORY CHANNEL SELECTION IN A MULTI-CHANNEL MEMORY

TECHNICAL FIELD

This disclosure relates to data storage, and more particularly relates to selecting a memory channel in a multi-channel memory system.

BACKGROUND

Computing systems may use multi-channel memory systems to alleviate memory bottlenecks by increasing the amount of available memory bandwidth. For example, a multi-channel memory system can include a plurality of memory controllers that each controls a separate memory unit. The plurality of memory controllers increases the available bandwidth of the multi-channel memory system compared to a memory system that includes only a single memory controller by being able to handle more memory requests than the single memory controller.

The performance of a multi-channel memory system can be optimized by keeping the workload of the memory channels in the multi-channel memory system well-balanced to maximize the utilization of the available bandwidth across the memory channels of the memory system. In a well-balanced multi-channel memory system, memory loads may be fairly spread across the memory controllers in the memory system. Conversely, unbalanced memory loads in the memory channels of the multi-channel memory system may decrease the advantages of multi-channel memory systems. For example, if a memory system is unbalanced so that some of the memory channels in the memory system shoulder a disproportionate amount of the memory load compared to other memory channels in the memory system, those other memory channels in the memory system may have available memory bandwidth that is underutilized, thereby decreasing the performance of the memory system.

SUMMARY

In general, this disclosure describes techniques for selecting a memory channel in a multi-channel memory system for storing data to optimize the utilization of available bandwidth across the memory channels of the multi-channel memory system. Inter-page interleaving and intra-page interleaving may be employed to distribute memory pages across memory channels, to more evenly balance memory utilization of the channels in the multi-channel memory system.

In one example, the disclosure is directed to a method. The method may include receiving a request to write data to a logical memory address of a memory system in a computing device, the logical memory address including a logical page number and a page offset, wherein the logical page number maps to a physical page number and the logical memory address maps to a physical memory address. The method may further include determining, by the computing device, a memory unit out of a plurality of memory units in the memory system by performing a logical operation on one or more bits of the page offset and one or more bits of the physical page number. The method may further include writing the data to a physical memory address in the determined memory unit in the memory system.

In another example, the disclosure is directed to a computer-readable storage medium comprising instructions that, when executed on at least one processor, causes the at least one processor to perform operations. The operations may include receiving a request to write data to a logical memory address of a memory system in a computing device, the logical memory address including a logical page number and a page offset, wherein the logical page number maps to a physical page number and the logical memory address maps to a physical memory address. The operations may further include determining, by the computing device, a memory unit out of a plurality of memory units in the memory system by performing a logical operation on one or more bits of the page offset and one or more bits of the physical page number. The operations may further include writing the data to a physical memory address in the determined memory unit in the memory system.

In another example, the disclosure is directed to a computing device. The computing device may include a processor. The computing device may further include a memory system. The computing device may further include a memory interface unit configured to receive a request from the processor to write data to a logical memory address of the memory system, the logical memory address including a logical page number and a page offset, wherein the logical page number maps to a physical page number and the logical memory address maps to a physical memory address. The computing device may further include a memory management unit configured to determine a memory unit out of a plurality of memory units in the memory system by performing a logical operation on one or more bits of the page offset and one or more bits of the physical page number. The computing device may further include a memory controller configured to write the data to the determined memory unit in the memory system.

In another example, the disclosure is directed to an integrated circuit. The integrated circuit may include a processor. The integrated circuit may further include a memory interface unit configured to receive a request from the processor to write data to a logical memory address of a memory system, the logical memory address including a logical page number and a page offset, wherein the logical page number maps to a physical page number and the logical memory address maps to a physical memory address. The integrated circuit may further include a memory management unit configured to determine a memory unit out of a plurality of memory units in the memory system by performing a logical operation on one or more bits of the page offset and one or more bits of the physical page number. The integrated circuit may further include a memory controller configured to write the data to the determined memory unit in the memory system.

In another example, the disclosure is directed to an apparatus. The apparatus may include means for receiving a request to write data to a logical memory address of a memory system in a computing device, the logical memory address including a logical page number and a page offset, wherein the logical page number maps to a physical page number and the logical memory address maps to a physical memory address. The apparatus may further include means for determining, by the computing device, a memory unit out of a plurality of memory units in the memory system by performing a logical operation on one or more bits of the page offset and one or more bits of the physical page number. The apparatus may further include means for writing the data to a physical memory address in the determined memory unit in the memory system.

The details of one or more examples are set forth in the accompanying drawings and the description below. Other features, objects, and advantages will be apparent from the description and drawings, and from the claims.

BRIEF DESCRIPTION OF DRAWINGS

FIGS. 2A-2D are conceptual diagrams that illustrate examples of storing pixel values of a surface in a linear and tiled fashion according to some aspects of the present disclosure.

DETAILED DESCRIPTION

Figure 1A:
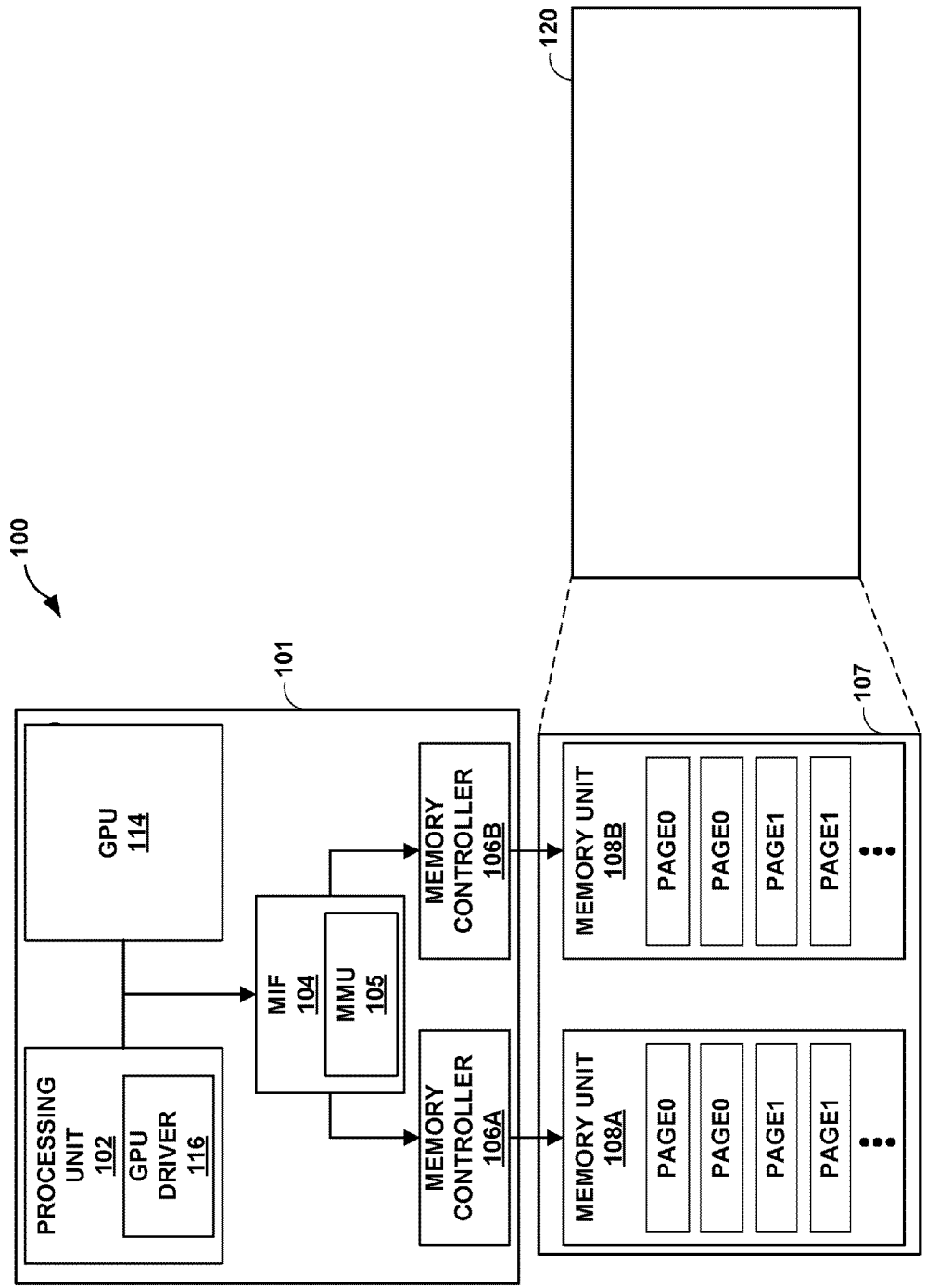
FIGS. 1A-1B are block diagrams illustrating a computing system according to some aspects of the present disclosure.

FIG. 1A is a block diagram illustrating a computing system according to some aspects of the present disclosure. As shown in FIG. 1A, computing device 100 may include a processing unit 102, a graphics processing unit (GPU) 114, memory interface unit (MIF) 104, memory management unit (MMU) 105, memory controller 106A, memory controller 106B, and memory 107. Processing unit 102 and GPU 114 may store data in and retrieve data from memory 107 via MIF 104, MMU 105, and memory controllers 106A and 106B.

Examples of computing device 100 may include, but are not limited to, video devices such as media players, set-top boxes, wireless handsets such as mobile telephones, personal digital assistants (PDAs), desktop computers, laptop computers, gaming consoles, video conferencing units, tablet computing devices, and the like.

In some examples, computing device 100 may include integrated circuit (IC) 101, and integrated circuit 101 may include processing unit 102, GPU 114, MIF 104, MMU 105, memory controller 106A, and memory controller 106B. Although FIG. 1A illustrates GPU 114 and processing unit 102 residing in a common package (e.g., a common hardware chip), aspects of this disclosure are not so limited. In some examples, processing unit 102 may be external to the package. Furthermore, in the examples where processing unit 102 is external to the package, GPU 114 may include MIF 104 and memory controllers 106A and 106B; however, this is not a requirement in every example where processing unit 102 is external to the package.

Thus, in some examples, processing unit 102, GPU 114, MIF 104, and memory controllers 106A and 106B may be individual hardware chips, and integrated circuit 101 may include the combination of these hardware chips. In other examples, one hardware chip may include one or more of processing unit 102, MIF 104, and memory controllers 106A and 106B, and another hardware chip may include GPU 114, and in these examples, integrated circuit 101 may include both of these two hardware chips. Other such permutations and combinations may be possible, including the example illustrated in FIG. 1A where processing unit 102, GPU 114, MIF 104, and memory controllers 106A and 106B are illustrated to be in a common package. In addition, integrated circuit 101 may include additional components than those shown in FIG. 1A, such as a video coder or other suitable components.

Integrated circuit 101 may be a specialized hardware unit designed for specific purposes, such as rendering graphics with specific performance criteria, such as massive parallel processing capabilities to render graphics in an accelerated fashion. In some instances, integrated circuit 101 may include specialized hardware in combination with a digital signal processor (DSP), a general purpose microprocessor, an application specific integrated circuit (ASIC), a field programmable gate array (FPGA), or other equivalent integrated or discrete logic circuitry. For example, GPU 114 may be specialized hardware, and processing unit 102 may be a DSP, a general purpose microprocessor, an ASIC, an FPGA, or any other suitable hardware.

Processing unit 102 may include one or more programmable processors, such as, but not limited to, a central processing unit (CPU), a co-processor, and the like. GPU 114 may be configured to perform graphics related functions such as determining pixel values for pixels of a display of device 100, which may be part of device 100 or coupled to device 100, and render the pixels of the display. For example, processing unit 102 may execute an application stored in memory system 107, such as a video game, a web browser, an e-mail application, or any other application that creates graphics that is to be presented. Processing unit 102 may instruct GPU 114 to perform graphics related functions to determine the pixel values such as color values, opacity values, and other such values for the graphics created by the execution of the application. In response, GPU 114 may perform the graphics related functions and render the pixels of the display based on the determined pixel values.

Graphics processing unit (GPU) driver 116 may function as the interface between processing unit 102 and GPU 114 that allows processing unit 102 to instruct GPU 114 to perform graphics related functions. For example, if processing unit 102 needs to transmit a command or an instruction to GPU 114, processing unit 102 may transmit the command or instruction to GPU 114 through GPU driver 116. The commands or instructions that processing unit 102 may transmit to GPU 114 may include commands to load and execute instructions of shader programs such as vertex shaders and fragment shaders, and commands indicating virtual memory addresses where GPU 114 may retrieve pixel values from or store pixel values into memory system 107. In this manner, processing unit 102 may control the functionality of GPU 114.

The virtual addresses that GPU 114 utilizes to retrieve or store pixel values may be part of a virtual memory scheme that keeps the actual locations of where the pixel values are stored or being retrieved from "hidden" from GPU 114. For example, virtual memory is a memory management technique that virtualizes memory system 107 so that GPU 114 may need only to refer to the virtual addresses for retrieving and storing pixel values. In these examples, GPU driver 116 of processing unit 102 may transmit the virtual addresses to GPU 114 that indicate to GPU 114 where to store the pixel values or from where to retrieve the pixel values. Throughout this disclosure, when referring to memory and the storage and retrieval of data into and out of memory, the terms "virtual" and "logical" may be used interchangeably, so that virtual memory may also be referred to as logical memory, virtual memory address may also be referred to as logical memory address, and so on.

GPU driver 116 may be software that is executing on processing unit 102. In this example, memory system 107 stores the source code or object code of GPU driver 116 that processing unit 102 retrieves for execution. Alternatively, GPU driver 116 may be hardware embedded within processing unit 102, or hardware external to processing unit 102 that couples to processing unit 102 and GPU 114. In some examples, GPU driver 116 may be hardware, software, firmware, and the like, including any combination thereof. For purposes of illustration and clarity, the examples described in this disclosure are described in context of GPU driver 116 being software executing on processing unit 102.

As indicated above, GPU 114 may store pixel values into and retrieve pixel values from memory system 107. For accessing memory system 107, GPU 114 may use memory interface (MIF) 104 and memory controllers 106A and 106B. MIF 104 and memory controllers 106A and 106B may be hardware, software, firmware, and the like, including any combination thereof.

In some examples, MIF 104 may provide an interface between processors, such as processing unit 102 and GPU 114, and memory system 107. MIF 104 may include MMU 105, which may handle requests for access to memory system 107 from processing unit 102, including performing translations of logical memory addresses to physical memory addresses in memory system 107 as well as performing other tasks. Memory controllers 106A and 106B may regulate the flow of data in and out of respective memory units 108A and 108B. Each one of memory controllers 106A and 106B may provide access to a corresponding one of memory units 108A and 108B of memory system 107. Each one of memory units 108A and 108B may be distinct portions of memory system 107 that are separately accessible. For example, memory system 107 may include a plurality of memory units 108A and 108B, and access to memory units 108A and 108B is provided by a corresponding one of memory controllers 106A and 106B.

In some examples, one of memory units 108A and 108B may be accessible via only its corresponding one of memory controllers 106A and 106B, and via no other memory controllers. For example, if memory controller 106A corresponds to memory unit 108A, then memory unit 108A may only be accessible via memory controller 106A, and memory controller 106B may not be able to access memory unit 108A. In this way, each one of memory controllers 106A and 106B provides a memory channel to memory system 107 via corresponding memory units 108A and 108B.

While aspects of this disclosure are described with computing device 100 including two memory controllers 106A and 106B, and memory system 107 including two memory units 108A and 108B, in some other examples computing device 100 may include more than two memory controllers, such as four memory controllers, and memory system 107 may include more than two memory units, such as four memory units, and the techniques described in this disclosure may be extendable to such examples as well. In examples where memory system 107 includes two memory units, memory system 107 may be referred to as a dual-channel memory system because there are two channels provided by two memory controllers 106A and 106B to two memory units 108A and 108B in memory system 107, respectively.

Examples of memory system 107 include, but are not limited to, a random access memory (RAM), a read only memory (ROM), an electrically erasable programmable read-only memory (EEPROM), flash memory, or any other medium that can be used to store desired program code in the form of instructions or data structures and that can be accessed by processing unit 102 and GPU 114. In some examples memory system 107 may comprise one or more computer-readable storage media, such as a computer-readable storage device. For instance, memory system 107 may include instructions that cause processing unit 102 and GPU 114 to perform the functions ascribed to them in this disclosure.

Memory system 107 may, in some examples, be considered as a non-transitory storage medium. The term "non-transitory" may indicate that the storage medium is not embodied in a carrier wave or a propagated signal. However, the term "non-transitory" should not be interpreted to mean that memory system 107 is non-movable. As one example, memory system 107 may be removed from device 100, and moved to another device. As another example, a storage device, substantially similar to memory system 107, may be inserted into device 100. In certain examples, a non-transitory storage medium may store data that can, over time, change (e.g., in RAM).

MIF 104 may be the interface that allows GPU 114 and processing unit 102 to access data (e.g., pixel values) from memory units 108A and 108B via memory controllers 106A and 106B, respectively. For example, MIF 104 may include MMU 105 that maps virtual memory addresses into physical memory addresses. For instance, to store pixel values into or retrieve pixel values from a particular memory address within memory system 107, GPU 114 may output a virtual memory address associated with the particular memory address to MIF 104. MMU 105 of MIF 104 may determine the particular memory address from the virtual memory address, and access the particular memory address in memory system 107. In the present disclosure the terms "logical" and "virtual" may be used interchangeably when referring to memory and memory addresses, so that a virtual page may also be referred to as a logical page, a virtual memory address may also be referred to as a logical memory address, a virtual memory space may also be referred to as a logical memory space, and so on.

The virtual memory space may be divided into a plurality of virtual pages. These virtual pages may be contiguous, but the physical pages (e.g., page0 and page1) in memory system 107 to which these virtual pages correspond may not be contiguous in memory system 107. Pages may be considered as the minimum units that MIF 104 may be able to manage.

Figure 1B:
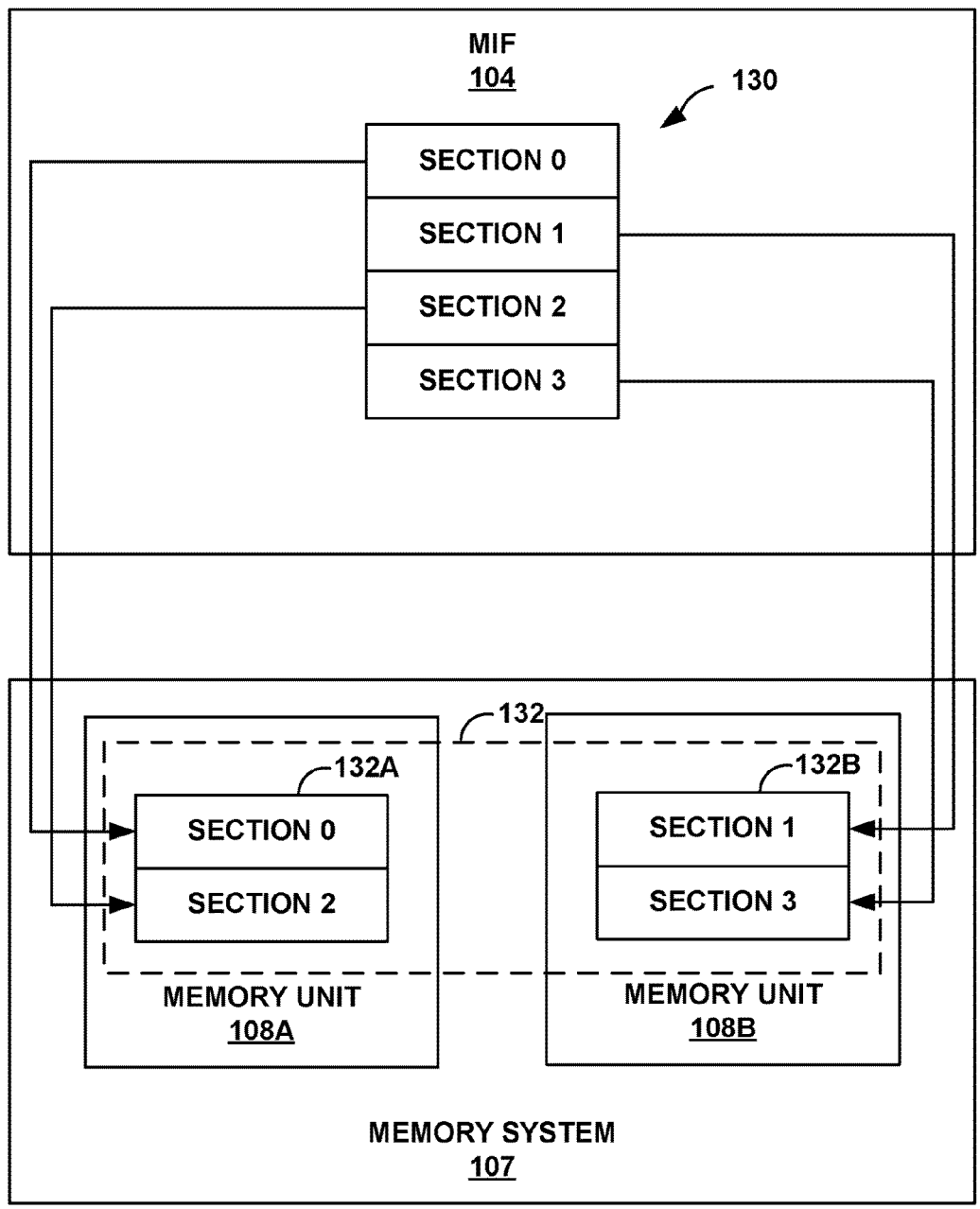

In aspects of this disclosure, a physical page mapped from a virtual page may encompass both memory unit 108A and memory unit 108B, as illustrated in more detail in FIG. 1B. FIG. 1B is a block diagram illustrating an example physical page of memory system 107. For example, FIG. 1B illustrates MIF 104 including a virtual page 130 which includes four sections (sections 0-3). It should be understood that virtual page 130 is a virtual construct that is illustrated in FIG. 1B for ease of understanding. In FIG. 1B, memory system 107 may include a physical page 132 that corresponds to virtual page 130.

Physical page 132 may encompass both memory unit 108A and memory unit 108B. For example, memory unit 108A may store a portion of physical page 132, indicated as portion 132A, and memory unit 108B may store a portion of physical page 132, indicated as portion 132B. As illustrated, memory unit 108A stores section 0 and section 2 of physical page 132, and memory unit 108B stores section 1 and section 3 of physical page 132.

Memory unit 108A may store section 0 and section 2, and memory unit 108B may store section 1 and section 3 because of integrated circuit 101 storing data in an interleaving manner. For instance, referring back to FIG. 1, GPU driver 116 may transmit instructions that cause GPU 114 to store pixel values, and may transmit the virtual addresses for where the pixel value are to be stored. GPU 114, in turn, may request MIF 104 to store the pixel values in accordance with the virtual addresses. MIF 104, in turn, may map the virtual addresses to physical addresses and store the pixel values in pages of memory system 107 in an interleaving manner based on the physical addresses.

MIF 104 may be configured to store the pixel values in an interleaving manner. As one example, MIF 104 may be preprogrammed to store the pixel values in the interleaving manner. As another example, MIF 104 may receive instructions that instruct MIF 104 to store the pixel values in the interleaving manner.

As part of the graphics related functions, GPU 114 may generate a surface of graphics image or content, such as surface 120, that is to be displayed on the display of device 100. GPU driver 116 may transmit instructions that cause GPU 114 to store the surface in memory system 107, and the virtual addresses as to where GPU 114 is to store the surface. Each surface may include pixel values that are stored in memory system 107.

In examples described in this disclosure, when GPU driver 116 transmits instructions, as one example, GPU driver 116 may transmit instructions directly to GPU 114 which cause GPU 114 to perform the instructed functions. As another example, GPU driver 116 may transmit an instruction that is stored in memory system 107. GPU driver 116 may then command GPU 114 to retrieve the stored instruction from memory system 107 via MIF 104, and perform the instructed function. In either of these examples, it may be considered that GPU driver 116 transmits instructions that cause GPU 114 to perform the instructed functions.

The surfaces may be viewed as a two dimensional (2D) array of pixel values, and GPU 114 may instruct MIF 104 to store the surfaces in a linear or tiled fashion in memory system 107. In some examples, the 2D array of pixel values may be approximately the same size as the number of pixels on the display. For example, the pixel values of the surface may represent the graphics image generated by GPU 114.

As one example, GPU driver 116, executing on processing unit 102, may transmit instructions that cause GPU 114 to store each line of the surface, which is then stored in memory system 107, where a line encompasses pixel values across one row of the surface. As another example, GPU driver 116 may transmit instructions to cause GPU 114 to store each tile of the surface, referred to as surface tile, which is then stored in memory system 107, where a tile encompasses M×N pixel values of the surface. In general, this disclosure may generally refer to storing portions of a surface, which may refer to storing a surface in linear or tiled fashion.

In this example, to store the surface in either the linear or tiled fashion, GPU driver 116 may transmit instructions that cause GPU 114 to store the pixel values at virtual addresses. MMU 105 of MIF 104 may determine the physical addresses that correspond to the virtual addresses, and GPU 114 through MIF 104 may store the pixel values at the pages of memory system 107 that correspond to the physical addresses.

MIF 104 may interleave between memory controllers 106A and 106B to store the pixel values in pages of memory system 107. The interleaving manner of storage refers to storing a first set of bytes, where one byte is eight bits, in memory unit 108A via memory controller 106A, followed by storing a second set of bytes in memory unit 108B via memory controller 106B, followed by storing a third set of bytes in memory unit 108A via memory controller 106A, followed by storing a fourth set of bytes in memory unit 108B via memory controller 106B, and so forth. In other words, the interleaved manner of storage may be considered as alternating the storage of bytes in memory unit 108A and memory unit 108B via respective memory controllers 106A and 106B. The number of bytes that are stored per interleave cycle may be referred to as an interleave granularity, and may be defined by GPU driver 116 or MIF 104 may be preprogrammed with the interleave granularity.

For example, in the example illustrated in FIG. 1B, physical page 132 (mapped from virtual page 130) may be able to store 4096 bytes of pixel values (e.g., 4 kilobytes (kB) of pixel values), which means that each one of sections 0-3 can store 1024 bytes of pixel values (e.g., 1 kB of pixel values). Also, assume that the interleave granularity is 1024 bytes. In this example, GPU driver 116 may cause GPU 114 to store the pixel values through MIF 104 such that a first 1 kB of pixel values of a line or tile of the surface is stored in section 0 in memory unit 108A via memory controller 106A, and such that a second 1 kB of pixel values of the line or tile of the surface is stored in section 1 in memory unit 108B via memory controller 106B, due to the interleave granularity of 1 kB. Also, GPU driver 116 may instruct cause GPU 114 to store the pixel values through MIF 104 such that a third 1 kB of pixel values of the line or tile of the surface is stored in section 2 in memory unit 108A via memory controller 106A, and such that a fourth 1 kB of pixel values of the line or tile of the surface is stored in section 3 in memory unit 108B via memory controller 106B, due to the interleave granularity of 1 kB.

Although the above example describes storage of pixel values in pages (e.g., physical page 132 or virtual page 130), aspects of this disclosure are not so limited. For example, it may not be necessary that memory system 107 is divided into a plurality of physical pages. Even in these examples, GPU driver 116 may cause GPU 114 to store pixel values through MIF 104 in the interleaving manner. In these examples, the storage bits within memory system 107 may be considered as a contiguous storage locations; however, contiguous storage may not be necessary in every example. As an example where memory system 107 is not necessarily divided into physical pages, GPU driver 116 may cause GPU 114 to store the pixel values through MIF 104 such that a first 1 kB of pixel values of a line or tile of the surface is stored in memory unit 108A via memory controller 106A, and such that a second 1 kB of pixel values of the line or tile of the surface is stored in memory unit 108B via memory controller 106B, due to the interleave granularity of 1 kB. Also, GPU driver 116 may cause GPU 114 to store pixel values through MIF 104 such that a third 1 kB of pixel values of the line or tile of the surface is stored in memory unit 108A via memory controller 106A, and such that a fourth 1 kB of pixel values of the line or tile of the surface is stored in memory unit 108B via memory controller 106B, due to the interleave granularity of 1 kB. For ease of description, various examples are described with examples where memory system 107 includes pages such as physical page 132.

For purposes of illustration, this disclosure describes storing bytes of pixel values. A byte is equal to 8 bits. Accordingly, storing 1024 bytes is equivalent to storing 8192 bits, where a bit may be a digital value of 0 or a digital value of 1. Therefore, although this disclosure describes storing bytes of pixel values, the techniques described in this disclosure are equivalent to storing bits of pixel values, where each byte is 8 bits.

In the example where memory system 107 includes physical page 132, the interleave granularity causes the half of the physical page 132 to be stored in memory unit 108A and the other half of the physical page 132 to be stored in memory unit 108B. Such interleave storage may promote efficient channel utilization. For example, the interleave granularity may cause MIF 104 to store half the pixel values using the channel established by memory controller 106A, and store half the pixel values using the channel established by memory controller 106B. Such storage of half the pixel values using the channel established by memory controller 106A and half the pixel values using the channel established by memory controller 106B may occur even in examples where memory system 107 is not divided into pages.

Also, storing pixel values in the interleave storage manner may allow GPU 114 to store pixel values via MIF 104 in memory system 107 in parallel. For example, GPU 114 may be able to store pixel values via MIF 104 in section 0 of portion 132A of physical page 132 within memory unit 108A via memory controller 106A at the same time (e.g., in parallel) that GPU 114 may be able to store pixel values via MIF 104 in section 1 of portion 132B of physical page 132 within memory unit 108B via memory controller 106B. Similar to above, the storage of pixel values within memory unit 108A via memory controller 106A occurring at the same time as the storage of pixel values within memory unit 108B via memory controller 106B may also occur even in examples where memory system 107 is not divided into pages.

However, as described in more detail, retrieving pixel values that have been stored in the interleave storage manner may not efficiently utilize the channels to memory system 107 established by memory controller 106A and memory controller 106B. For example, one of the functions of GPU 114 is to render the final pixel values on the display of device 100 for presentation. For instance, after the surface is stored in memory system 107, GPU 114 retrieves the pixel values of the surface from memory system 107 via MIF 104 to display the pixels on the display of device 100. The pixel values represent the graphics content or image that is to be displayed by the display.

In some examples, GPU 114 renders the display piece by piece, in a process referred to as rasterization. In rasterization, GPU 114 divides the display into a plurality of display tiles. GPU 114 then renders the graphics content for one display tile, then the next display tile, and so forth to render the final image on the display.

Each display tile may be a rectangular area of the display. For example, each display tile includes W×H pixels, where W is the width of the display tile, and H is the height of the display tile in pixels. The display tiles may be 16×16, 8×4, 8×8, 16×4, 16×8, 32×4, 32×8, 4×8, 4×16, 8×16, 4×32, or 8×32. However, aspects of this disclosure are not so limited, and in general any sized display tile is contemplated by the techniques described in this disclosure, including non-rectangular display tiles.

Display tiles (or screen tiles) should not be confused with storing a surface in tiled fashion (e.g., storing a surface tile). Display tiles are portions of the display for which GPU 114 renders the graphics content. To store a surface in tiled fashion means storing pixel values for the surface tiles in memory system 107. In other words, display tiles refer to tiles on the display, and surface tiles refer to tiles within the surface that is to be displayed. For clarity, examples in the disclosure may assume that the size of each display tile is 16×16, and the size of each surface tile is 4×4. The size of 16×16 for the display tile and the size of 4×4 for the surface tile are selected so that the size of the display tile and the size of the surface tile are different to avoid confusing display tile and surface tile. In alternate examples, it may be possible for the display tile and the surface tile to be of the same size, or sizes different than 16×16 and 4×4.

Figure 2C:
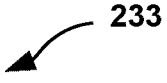

FIGS. 2A–2D are conceptual diagrams that illustrate examples of storing pixel values of a surface or a screen in a linear and tiled fashion, respectively. As shown in FIGS. 2A and 2B, respectively, surface 200A and surface 200B may include pixel values such as color values or texture values for corresponding pixels on the display of device 100. For example, surface 200A and surface 200B each include h by w pixel values, where h is the height of surface 200A and surface 200B and w is the width of surface 200A and surface 200B. In some examples, the height and width of surface 200A and surface 200B may be substantially similar to the height and width of the display of device 100. For example, the display of device 100 may have dimensions of h by w pixels, and each one of the pixel values of surface 200A and surface 200B may be a pixel value for a corresponding pixel of the display of device 100.

As shown in FIG. 2A, surface 200A includes h lines, and GPU 114 may store the pixel values in each of the h lines from top to bottom, and starting from left end of the line to the right end of the line in the pages of system memory system 107 using the memory interleaving technique described above. Storing pixel values in the manner described with respect to FIG. 2A may be referred to as storing pixel values in a linear fashion. For example as illustrated in FIG. 2A, GPU 114 may store pixel values for line 0 in a first portion of virtual memory 130, store pixel values for line 1 in a second portion of virtual memory 130, and so forth. As discussed above, the portions of the virtual memory 130 may be contiguous. MIF 104 may then store the pixel values into memory unit 108A and memory unit 108B of memory system 107 via memory controllers 106A and 106B.

As shown in FIG. 2B, surface 200B includes an X number of surface tiles, where each surface tile is M×N in size. For example, each surface tile corresponds to M×N pixels on the display of device 100. GPU 114 may store the M×N pixel values in each surface tile starting from the top-left surface tile (e.g., tile 0) and ending with bottom-right surface tile (e.g., the X−1). Storing pixel values in the manner described with respect to FIG. 2B may be referred to as storing pixel values in a tiled fashion. For example as illustrated in FIG. 2B, GPU 114 may store pixel values for surface tile 0 in a first portion of virtual memory 130, store pixel values for surface tile 1 in a second portion of virtual memory 130, and so forth. Similar to FIG. 2A, the portions of the virtual memory 130 may be contiguous. Also, similar to FIG. 2A, in FIG. 2B, MIF 104 may then store the pixel values into memory unit 108A and memory unit 108B of memory system 107 via memory controllers 106A and 106B.

In some instances, storing pixel values in a linear fashion may be considered as a special case of storing pixel values in a tiled fashion. For example, assume that the size of a surface tile is w by 1 (e.g., M equals w, and N equals 1). In this example, the size of the surface tile is the same as the size of a line of surface 200A, and storing pixel values in a tiled fashion may be the same as storing pixel values in a linear fashion, in this example. In general, this disclosure may generally refer to storing portions of a surface (e.g., surface 200A or surface 200B), which may refer to storing a surface in linear or tiled fashion.

When GPU 114 generates the pixel values for the surface (e.g., the image or graphics content that is to be displayed on the display of device 100), GPU 114 may store the pixel values in linear fashion or tiled fashion in an interleaving manner based on the interleave granularity to efficiently use the memory channels in system memory system 107 provided by memory controller 106A and memory controller 106B. However, when GPU 114 retrieves the pixel values from system memory system 107, GPU 114 may not be able to efficiently utilize the channels to memory system 107 provided by memory controller 106A and memory controller 106B when the surface is stored in linear or tiled fashion.

Figure 3A:
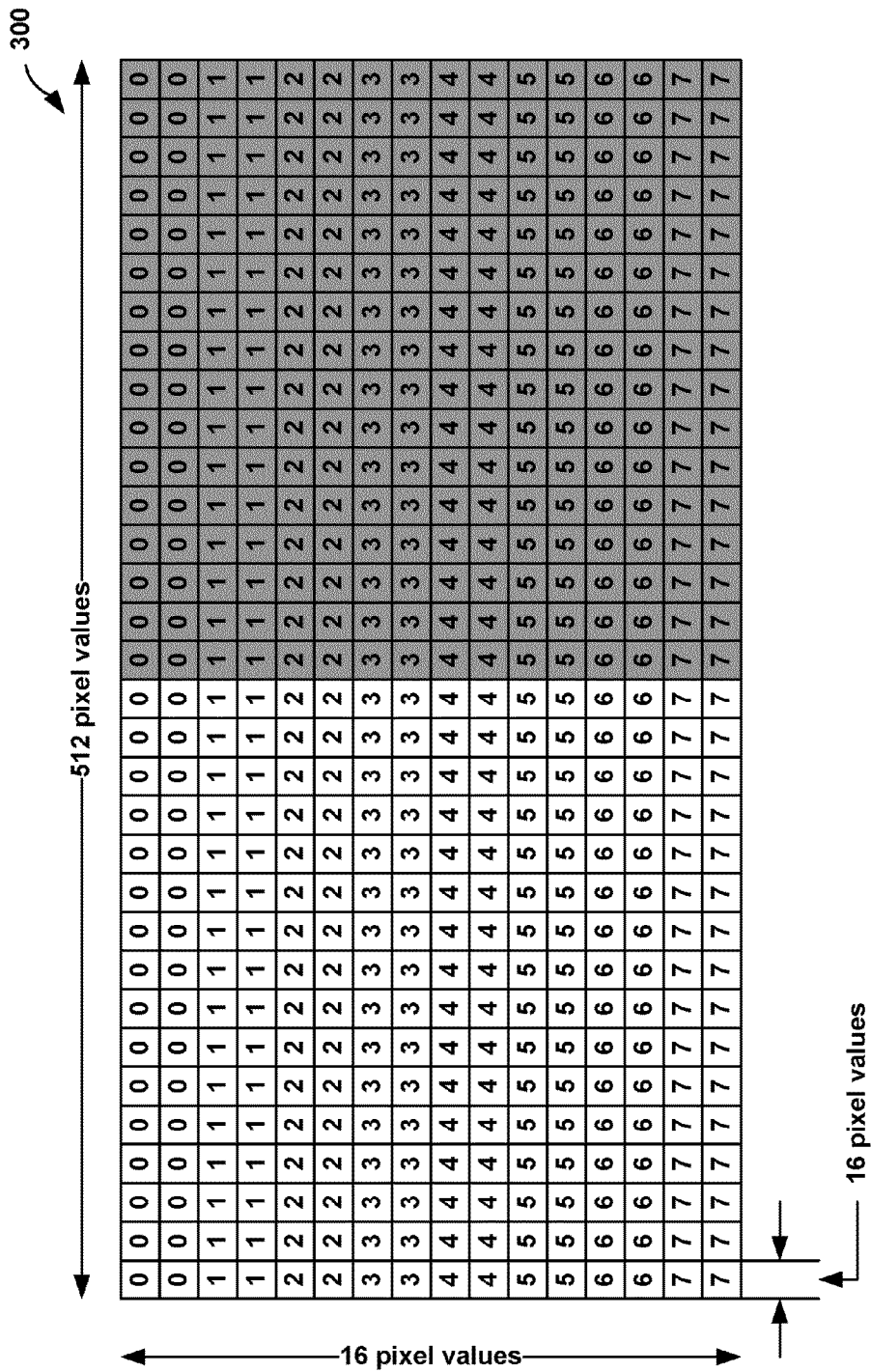
FIGS. 3A and 3B are graphical diagrams illustrating storage of a surface in system memory in a linear fashion according to aspects of the disclosure.

For example, a display interacting with device 100 may include a right-half and a left-half. As shown in FIG. 3A, when GPU 114 stores the pixel values in linear or tiled fashion, GPU 114 may retrieve all of the pixel values that correspond to the left-half of the display via MIF 104 using only memory controller 106A, and none from memory controller 106B. Similarly, GPU 114 may retrieve all of the pixel values that correspond to the right-half of the display via MIF 104 using only memory controller 106B, and none from memory controller 106A. In this way, when GPU 114 renders a display tile that is in the left-half of the display, GPU 114 may only retrieve pixel values via MIF 104 from memory controller 106A, leaving the channel established by memory controller 106B idle, which may be inefficient usage of the channels to system memory system 107. Similarly, when GPU 114 renders a display tile that is in the right-half of the display, GPU 114 may only retrieve pixel values via MIF 104 from memory controller 106B, leaving the channel established by memory controller 106A idle, which may also be inefficient usage of the channels to system memory system 107.

Figure 2D:
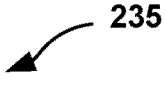

FIG. 2C is a conceptual diagram illustrating an example of a surface tile. For example, FIG. 2C illustrates a 4×4 surface tile 233 that includes a total of 16 pixels in a tile. FIG. 2D is a conceptual diagram illustrating an examples display tiles. For example, FIG. 2D illustrates a display 235 that includes sixteen display tiles (e.g., display tiles 0-15). As one example, each display tile may include 16×16 pixels. In other words, display tile 0 may include 16×16 pixels, display tile 1 may include 16×16 pixels, and so forth. In this example, display 235 may include 64×64 pixels (i.e., 16 horizontal pixels per display tile*4 display tiles equals 64 horizontal pixels, and 16 vertical pixels per display tile*4 display tiles equals 64 vertical pixels for a total of 64×64 pixels).

Figure 3B:
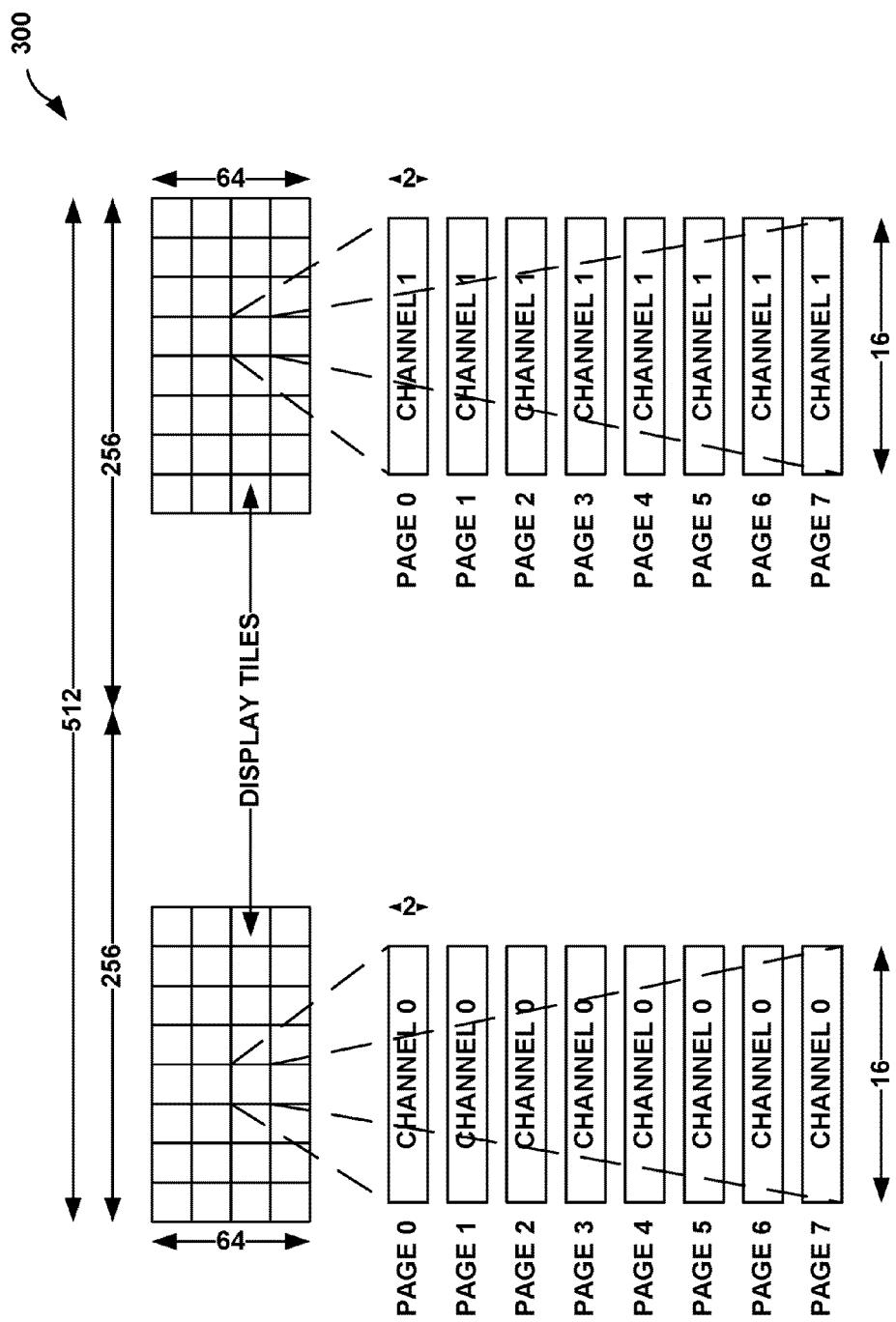

FIG. 3A-3B are graphical diagrams illustrating storage of a surface in system memory in a linear fashion, similar to the storage of pixel values in a linear fashion as shown in FIG. 2A, according to aspects of the disclosure. As shown in FIG. 3A, surface 300 may have a width (w) of 512 pixel values and a height (h) of 16 pixel values, which may also be the dimensions of a display of computing device 100 because the dimensions of surface 300 may be the same as the dimensions of the display of device 100. Each column in surface 300 may represent 16 pixel values, and surface 300 having a width of 512 pixel values may include 32 columns that each represent 16 pixel values (i.e. 512 pixel values/16 pixel values per column=32 columns).

Each pixel value in surface 300 may include 32 bits of data. If each byte includes 8 bits, then each pixel value in surface 300 may include 4 bytes of data. For example, each pixel value may represent a red-green-blue (RGB) color value and an opacity value. In this example, the red value may include 8 bits, the green value may include 8 bits, the blue value may include 8 bits, and the opacity value may include 8 bits, for a total of 32 bits. Because a row of surface 300 includes 512 pixel values, each row of surface 300 may include 2048 bytes of data (i.e., 512 pixel values*4 bytes per pixel value).

If each physical page (such as page0 and page1) of memory system 107 includes 4096 bytes with a memory interleave granularity of 1024 bytes, then each physical page may be divided into four portions of 1024 bytes. As shown in FIG. 1A, in a dual-channel memory system 107 including a first memory channel (made up of memory controller 106A and memory unit 108A) and a second memory channel (made up of memory controller 106B and memory unit 108B), if the first portion of the page resides in the first memory channel, then the second portion of the page resides in the second memory channel, the third portion of the page resides in the first memory channel, and the fourth portion of the page resides in the second memory channel.

The numerical values 0-7 shown in FIG. 3A may indicate which page in system memory system 107 stores the pixel values for surface 300 if GPU 114 stores the pixel values of surface 300 in a linear fashion. For example, each page may be able to store 4096 bytes, and each row in FIG. 3A represents 2048 bytes of pixel values (i.e., 512 pixel values*4 bytes per pixel value=2048 bytes of pixel values), and, pixel values for two lines can be stored in one page (i.e., 2048*2 equals 4096). Accordingly, in FIG. 3A, the numerical value 0 in the first two rows means that 4096 bytes of pixel values in first two lines of surface 300 are stored in page0, the numerical value 1 in the next two rows means that the 4096 bytes of pixel values in the second two lines of surface 300 are stored in page1, and so forth. The numerical value 7 in the last two rows means that the 4096 bytes of pixel values in the last two lines of surface 300 are stored in page7.

As shown in FIG. 3A, given a page size of 4096 bytes, a memory interleave granularity of 1024 bytes, and two memory channels in system memory system 107, the left-half of surface 300 may be presented in white background and the right-half of surface 300 may be presented with a gray background. The different colored backgrounds illustrate which one of memory units 108A and 108B is used to store surface 300. For example, the white background of the left-half of surface 300 may denote that the pixel values in the left-half of surface 300 are stored in memory unit 108A in system memory system 107 via memory controller 106A, and the gray background of the right-half of surface 300 may denote that pixel values in the right-half of surface 300 are stored in memory unit 108B in system memory system 107 via memory controller 106B.

Similar to the above examples, the interleave granularity is 1024 bytes, and each line of surface 300 includes 2048 bytes. Therefore, in this example, GPU driver 116 may transmit instructions that cause GPU 114 to store pixel values such that MIF 104 first stores 1024 bytes in page 0 via memory unit 108A and memory controller 106A, then store the next 1024 bytes in page 0 via memory unit 108B and memory controller 106B due to the interleaving between memory unit 108A and memory unit 108B with an interleave granularity of 1024 bytes. Also, because each pixel value is 4 bytes, 256 pixel values may equal 1024 bytes (i.e., 256*4=1024). Therefore, in order to store the first line of surface 300 in FIG. 3A, MIF 104 may first store the first 1024 bytes, which would be for the first 256 pixel values in the first line of surface 300, in page 0 via memory unit 108A and memory controller 106B. Then, MIF 104 would store the second 1024 bytes, which would be for the next 256 pixel values in the first line of surface 300, in page 0 via memory unit 108B and memory controller 106B due to the interleaving between memory unit 108A and memory unit 108B with an interleave granularity of 1024 bytes.

Because 256 pixel values is half of 512 pixel values, the pixel values in the first half of the first line of surface 300 would be stored in system memory system 107 via memory unit 108A and memory controller 106A (hence the white background), and the pixels in the second half of the first line of surface 300 would be stored in system memory system 107 via memory unit 108B and memory controller 106B (hence the gray background). The same result would occur for the second line of pixel values of surface 300, and then page 0 would be full. Next, as illustrated in FIG. 3A, the pixel values for the third line of surface 300 would be stored in page 1. For the same reasons described above with respect to the first line, the pixel values for the first half of the third line of surface 300 would be stored in page 1 via memory unit 108A and memory controller 106A (hence the white background), and the second half of the third line of surface 300 would be stored in page 1 via memory unit 108B and memory controller 106B (hence the gray background).

Furthermore, as described above, the size of surface 300 may be the same as the size of the display of device 100. Therefore, the left-half of surface 300 may correspond to pixels on the left-half of the display of device 100, and the right-half of surface 300 may correspond to the pixels on the right-half of the display of device 100.

As described above, GPU 114 may render the pixel values stored in system memory system 107 in a process referred to as rasterization. For example, GPU 114 may divide the display of device 100 into display tiles, and renders the pixel values for the pixels within one display tile, then the next display tile, and so forth to render the final image on the display of device 100. If a display tile is 16×16 pixels, then a single display tile may correspond to one column of surface 300. For instance, as described above, each column is 16 pixel values wide, and the height of each column is 16 pixel values. Therefore, because each column of surface 300 represents 16×16 pixels of the display of device 100, each column of surface 300 represents pixel values for one display tile.

When GPU 114 requests MIF 104 to retrieve the pixel values for one display tile (e.g., one column of surface 300 in FIG. 3A) from memory system 107, MIF 104 may be able to retrieve this display tile from only one of memory unit 108A via memory controller 106B or memory unit 108B via memory controller 106B, but not both. For example, when GPU 114 receives pixel values for a first display tile, MIF 104 may retrieve the first display tile (e.g., the first column in FIG. 3A), only from memory unit 108A via memory controller 106A, and not from memory unit 108B via 106B because all of the pixel values for the first column of surface 300 were stored in memory unit 108A of system memory system 107 (e.g., as illustrated, the first column of surface 300 is with white background). Similarly, when GPU 114 receives pixel values for the last display tile, MIF 104 may retrieve the last display tile (e.g., the last column in FIG. 3A) from memory unit 108B via memory controller 106B, and not memory unit 108A via memory controller 106A because of the pixel values for the last column in FIG. 3A were stored in memory unit 108B of system memory system 107 (e.g., as illustrated, the last column of surface 300 is with gray background).

Figure 4A:
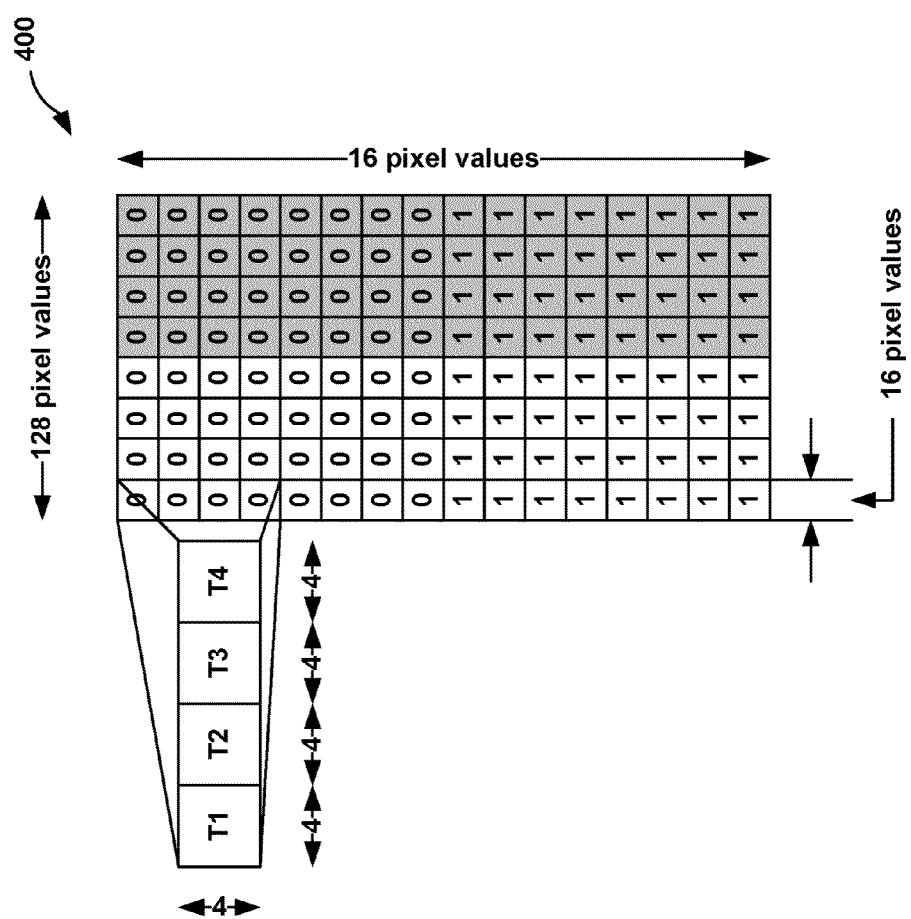
FIGS. 4A and 4B are graphical diagrams illustrating storage of a surface in system memory in a tiled fashion according to aspects of the disclosure.
Figure 4B:
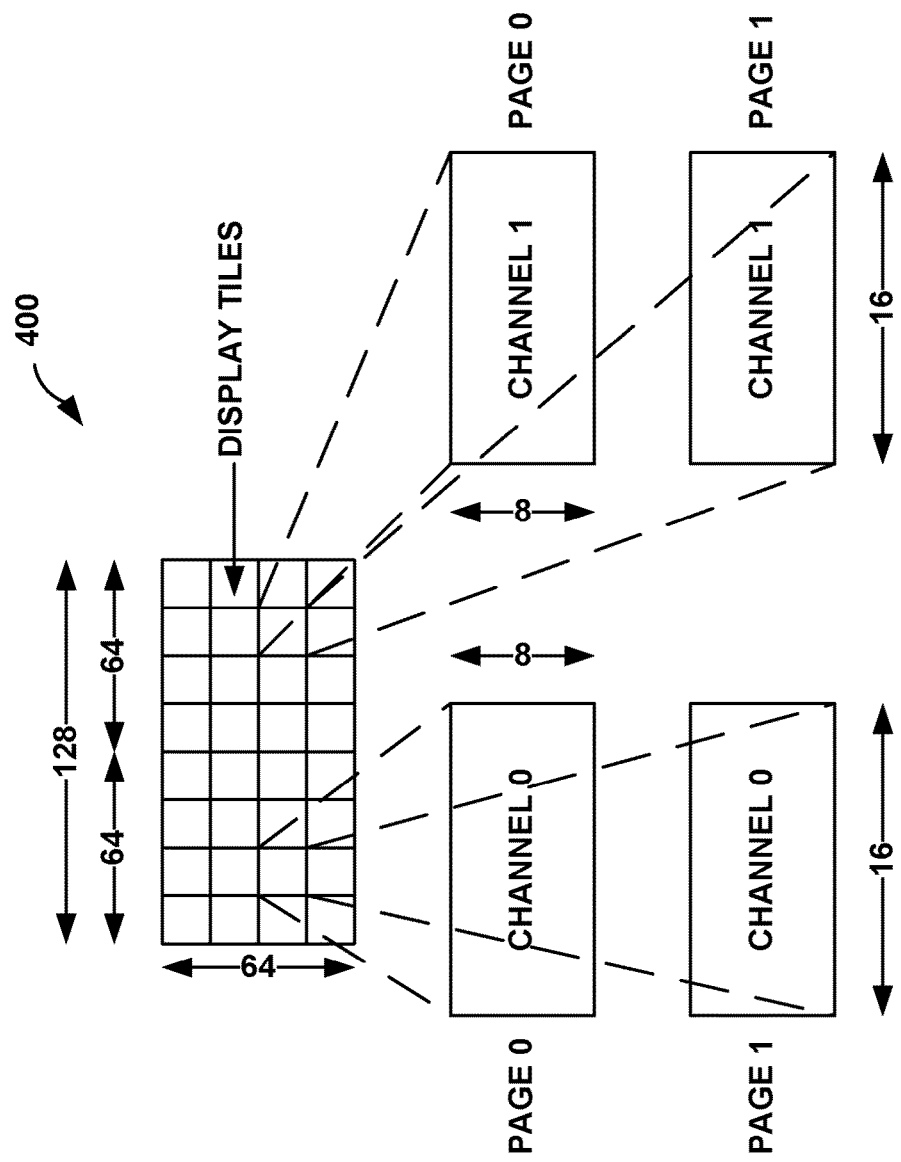

This retrieval may be an inefficient usage of system memory system 107. For instance, in the example of FIG. 3A, GPU 114 would not be able to receive pixel values for a display tile in parallel from memory unit 108A and memory unit 108B because MIF 104 may retrieve pixel values for each display tile only from either memory unit 108A or memory unit 108B, but not from both, thus limiting the rate at which GPU 114 can render the pixels on the display by limiting the rate at which MIF 20 can retrieve pixels of a display tile. Furthermore, although FIG. 3A illustrates an example where the surface is stored in system memory system 107, in linear fashion, a similar result may occur when the surface is stored in system memory system 107 in tiled fashion, as illustrated in FIGS. 4A and 4B.

Although the previous examples describe examples where the pixel values are color values to render the surface, aspects of this disclosure are not so limited. In other examples, the techniques of this disclosure may be extendable to examples where GPU 114 reads texture values from memory unit 108A and memory unit 108B.

FIG. 3B is a graphical diagram illustrating storage of display tiles in system memory when the surface is stored in a linear fashion. For example, FIG. 3B illustrates the results of FIG. 3A from the perspective of the display. For instance, FIG. 3B illustrates which memory channel was used to store the pixel values for two of the display tiles when surface 300 is stored in a linear fashion.

As illustrated in FIG. 3B, all of the pixel values for a display tile in the left half of the display are stored in pages 0-7 of memory system 107 via channel 0, and all of the pixel values for a display tile in the right half of the display are stored in pages 0-7 of memory system 107 via channel 1. In this example, channel 0 refers to storing pixel values in memory unit 108A via memory controller 106A, and channel 1 refers to storing pixel values in memory unit 108B via memory controller 106B.

For instance, as described above with respect to FIG. 3A, all of the pixel values of the display tiles in the left half may be stored in pages 0-7 of memory unit 108A via memory controller 106A. FIG. 3B illustrates this by indicating that for a display tile in the left half, the pixel values for that display tile are stored in pages 0-7 of memory unit 108A via memory controller 106A (i.e., channel 0). Also, as described above with respect to FIG. 3A, all of the pixel values of the display tiles in the right half may be stored in pages 0-7 of memory unit 108B via memory controller 106B. FIG. 3B illustrates this by indicating that for a display tile in the right half, the pixel values for that display tile are stored in pages 0-7 of memory unit 108B via memory controller 106B (i.e., channel 1).

Also, as described above with respect to FIG. 3A, one display tile may be 16 pixels wide, which is illustrated in FIG. 3B with value of 16 that extends the width of the expanded display tile. The value of 2 illustrated in FIG. 3B indicates that one page may store two rows of a display tile. For example, as described above with respect to FIG. 3A, the first two rows of surface 300 may be stored in page 0, which is indicated by the value of 2 in FIG. 3B.

The channel load balance of memory system 107 storing pixel values of surface 300 may be quantified by calculating display tile channel utilization $u=T/(nb)$, where T is the total number of pixel values of the display tile, n is the number of memory channels, and b is the maximum number of pixels of the display tile that are located in a single channel of the dual-channel memory system. Thus, for example surface tile 300, T may equal 16*16=256, n may equal 2 (for the two channels of memory system 107), and b may equal 256 (because all of the pixel values of the display tile is located in a single channel), and display tile channel utilization u may equal 256/(2*256), which may equal 0.5, which may be considered suboptimal channel utilization because it indicates that only half of the available memory bandwidth provided by memory controllers 106A and 106B is used when retrieving each display tile of surface 300 from memory system 107, leaving the other half of the available memory bandwidth idle.

Although the previous examples describe examples where the pixel values are color values to render the surface, aspects of this disclosure are not so limited to those examples of rendering the surface. In other examples, the techniques of this disclosure may be extendable to examples where GPU 114 reads texture values and the like from memory unit 108A and memory unit 108B.

FIG. 4A is a graphical diagram illustrating storage of a surface in system memory in a tiled fashion according to aspects of the disclosure. For example, as described above with respect to FIG. 2B, MIF 104 may store the pixel values of surface 200B, generated by GPU 114, in a tiled fashion in system memory system 107. As shown in FIG. 4A, surface 400 may have a width (w) of 128 pixel values, and a height (h) of 16 pixel values, which may also be the dimensions of a display of computing device 100 because the dimensions of surface 400 may be the same as the size of the display of device 100. Similar to FIG. 3A, each column of surface 400 in FIG. 4A represents 16 pixel values in width. Therefore the 128 pixel values width of surface 400 includes 8 columns that each include 16 pixel values (i.e., 128 pixel values/8 columns=16 pixel values per column).

Each pixel value in surface 400A may include 4 bytes of data. The numerical values 0 and 1 in FIG. 4A indicate which page in system memory system 107 stores the pixel values for surface 400. For example, each page may be able to store 4096 bytes, and each row in FIG. 4A may represent 512 bytes of pixel values (i.e., 128 pixel values*4 bytes per pixel value=512 bytes of pixel values). Therefore, pixel values for the eight rows can be stored in one page (i.e., 512 bytes*8 equals 4096 bytes). Accordingly, in FIG. 4A, the numerical value 0 in the first eight rows of surface 400 may indicate that 4096 bytes of pixel values in first eight rows of surface 400 are stored in page 0, the numerical value 1 in the next eight rows means that the 4096 bytes of pixel values in the next eight rows of surface 400 are stored in page 1, and so on.

MIF 104 may store surface 400 in memory system 107 as 4 pixel value by 4 pixel value surface tiles. FIG. 4A illustrates the first four rows and the first column expanded to illustrate the four 4×4 surface tiles (e.g., tiles T1, T2, T3, and T4). For example, because each column is 16 pixel values wide, one column of surface 400 may represent the width of the four tiles T1, T2, T3, and T4 that are each 4 pixel values wide. Also, because each row is one pixel value in length, four rows of surface 400 represent the length of one tile (e.g., one of T1, T2, T3, and T4).

If a surface tile is 4×4 pixel values, and each pixel value is 4 bytes, then each surface tile includes 64 bytes (i.e., 4*4*4 bytes per pixel value equals 64 bytes). Therefore, four rows and one column in surface 400 may include 256 bytes (64 bytes per tile*4 tiles for every four rows and one column equals 256 bytes). Furthermore, four rows and four columns in surface 400 may include 1024 bytes (e.g., 256 bytes for four rows and columns*4 columns equals 1024 bytes). Four rows and four columns of surface 400 represent 64×4 pixel values, which includes 1024 bytes (i.e., 64*4*4 bytes per pixel value equals 1024 bytes).

Accordingly, when storing surface 400 in tiled fashion, MIF 104 may store the first 64×4 pixel values (e.g., the block in FIG. 4A that includes rows 1-4 and columns 1-4) in page 0 in memory unit 108A via memory controller 106A, then store the next 64×4 pixel values (e.g., the block in FIG. 4A that includes rows 1-4 and the columns 5-8) in page 0 in memory unit 108B via memory controller 106B. This may be the case because 64×4 pixel values equal 1024 bytes (64*4*4 bytes per pixel value), and the interleave granularity is 1024 bytes.

As illustrated, the first 64×4 pixel values include the numerical value 0 to indicate that these pixel values are stored in page 0, and have white backgrounds to indicate that these pixel values are stored in memory unit 108A via memory controller 106A. The next 64×4 pixel values (e.g., the block that includes the rows 1-4 and columns 5-8) include the numerical value 0 to indicate that these pixel values are stored in page 0, and have gray background to indicate that these pixel values are stored in memory unit 108B via memory controller 106B. Therefore, a block of surface 400 that includes four rows and eight columns includes 2048 bytes. For example, four rows and eight columns of surface 400 represent 128×4 pixel values, 128*4*4 bytes per pixel value equals 2048 bytes.

For reasons similar to those described above, MIF 104 may store the next 64×4 pixel values (e.g., the block that includes rows 5-8 and columns 1-4) in page 0 in memory unit 108A via memory controller 106A, and the 64×4 pixel values after that (e.g., the block that includes rows 5-8 and the columns 5-8) in page 0 in memory unit 108B via memory controller 106B, as indicated by the respective white and gray backgrounds. In this example, after MIF 104 stores the block that includes rows 1-8 and columns 1-8, page0 may be full because page 0 may have stored a total of 4096 bytes.

Subsequently, MIF 104 may store the block of surface 400 that includes rows 9-16 and columns 1-8 in page1 of memory unit 108A and memory unit 108B via memory controller 106A and memory controller 106B as indicated with the white and gray backgrounds. For example, MIF 104 may store the pixel values of surface 400 in the block that includes row 9-12 and column 1-4 in page 1 of memory unit 108A via memory controller 106A, and store the pixel values of surface 400 in the block that includes row 9-12 and column 5-8 in page 1 of memory unit 108B via memory controller 106B due to the interleave granularity of 1024 bytes. The same applies to the pixel values of surface 400 in the block that includes rows 13-16 and column 1-4, and the block that includes rows 13-16 and column 5-8.

The tile storage scheme described with respect to FIG. 4A may be inefficient when GPU 114 subsequently receives the pixel values for reasons similar to those described above with respect to FIG. 3A. For example, for rasterization, GPU 114 may divide the display of device 100 into display tiles of 16×16 pixels. Similar to FIG. 3A, in FIG. 4A, one full column corresponds to one display tile. When GPU 114 receives pixel values for a first display tile, MIF 104 may retrieve pixel values for the first display tile (e.g., the first column in FIG. 4A) only from memory unit 108A via memory controller 106A, and not from memory unit 108B via memory controller 106B because all of the pixel values for the first column of surface 400 were stored in memory unit 108A of system memory system 107 via memory controller 106A. Similarly, when GPU 114 receives pixel values for the last display tile (e.g., the last column in FIG. 4A), MIF 104 may retrieve pixel values for the last display tile only from memory unit 108B via memory controller 106B, and not memory unit 108A via memory controller 106A because of the pixel values for the last column in FIG. 4A were stored in memory unit 108B of system memory system 107 via memory controller 106B.

Similar to FIG. 3A, in the example of FIG. 4A, MIF 104 is not be able to retrieve pixel values for a display tile in parallel from memory unit 108A and memory unit 108B because pixel values for each display tile can only be retrieved from either memory unit 108A or memory unit 108B, but not from both. This results in limiting the rate at which GPU 114 can render the pixels on the display.

FIG. 4B is a graphical diagram illustrating storage of display tiles in system memory when the surface is stored in tiled fashion. For example, FIG. 4B illustrates the results of FIG. 4A from the perspective of the display. For instance, FIG. 4B illustrates which memory channel was used to store the pixel values for two of the display tiles when surface 400 is stored in a tiled fashion.

As illustrated in FIG. 4B, similar to FIG. 4A, all of the pixel values for a display tile in the left half of the display are stored in pages 0 and 1 of memory system 107 via channel 0, and all of the pixel values for a display tile in the right half of the display are stored in pages 0 and 1 of memory system 107 via channel 1. Similar to FIG. 3B, in this example, channel 0 refers to storing pixel values in memory unit 108A via memory controller 106A, and channel 1 refers to storing pixel values in memory unit 108B via memory controller 106B.

For instance, as described above with respect to FIG. 4A, all of the pixel values of the display tiles in the left half may be stored in pages 0 and 1 of memory unit 108A via memory controller 106A. FIG. 4B illustrates this by indicating that for a display tile in the left half, the pixel values for that display tile are stored in pages 0 and 1 of memory unit 108A via memory controller 106A (i.e., channel 0). Also, as described above with respect to FIG. 4A, all of the pixel values of the display tiles in the right half may be stored in pages 0 and 1 of memory unit 108B via memory controller 106B. FIG. 4B illustrates this by indicating that for a display tile in the right half, the pixel values for that display tile are stored in pages 0 and 1 of memory unit 108B via memory controller 106B (i.e., channel 1).

Also, as described above with respect to FIG. 4A, one display tile may be 16 pixels wide, which is illustrated in FIG. 4B with value of 16 that extends the width of the expanded display tile. The value of 8 illustrated in FIG. 4B indicates that one page may store eight rows of a display tile. For example, as described above with respect to FIG. 4A, the eight rows of surface 400 may be stored in page 0, which is indicated by the value of 8 in FIG. 4B.

The channel load balance of memory system 107 storing pixel values of surface 400 may be quantified by calculating display tile channel utilization u=T/(nb), where T is the total number of pixel values of the display tile, n is the number of memory channels, and b is the maximum number of pixels of the display tile that are located in a single channel of the dual-channel memory system. Thus, for example surface 400, T may equal 16*16=256 (for the 16×16 display tiles), n may equal 2 (for the two channels of memory system 107), and b may equal 256 (because all of the pixel values of the display tile is located in a single channel), and display tile channel utilization u may equal 256/(2*256), which may equal 0.5, which may be considered suboptimal channel utilization because only half of the available memory bandwidth provided by memory controllers 106A and 106B is used when retrieving each display tile of surface 400 from memory system 107.

FIGS. 3A-3B and 4A-4B illustrate examples where GPU 114 may not efficiently utilize the channels to system memory system 107 when retrieving pixel values for rasterization. For instance, in the examples described with respect to FIGS. 3A-3B and 4A-4B, there may be poor channel load balance between memory unit 108A and memory unit 108B when retrieving pixel values for one display tile because MIF 104 may retrieve the pixel values for one display tile from either memory unit 108A or memory unit 108B, but not both. This poor channel load balance may result in low memory utilization (e.g., an inability of MIF 104 to retrieve pixel values for a display tile from both memory unit 108A and memory unit 108B at the same time).

As described above, MIF 104 is described as accessing memory units 108A and 108B in system memory system 107 via memory controller 106A and memory controller 106B. In other examples, computing device 100 may include more than two memory controllers and more than two memory units. Even in examples where computing device 100 includes more than two memory controllers, there may be cases where the linear or tile storage scheme may result in inefficient utilization of system memory system 107 when MIF 104 subsequently retrieves the pixel values for rendering by GPU 114. For example, if the display resolution is 512 pixels wide, each pixel is stored as 32-bit data, the display tile is 16×16, the page size is 4096 bytes, there are four memory channels, the interleave granularity is 1024 bytes, and the surface is stored in the linear fashion in system memory system 107, then MIF 104 may inefficiently utilize system memory system 107 when retrieving pixel values for rendering by GPU 114 as part of the rasterization. As another example, if the display resolution is 128 pixels wide, each pixel is stored as 32-bit data, the display tile is 16×16, the page size is 4096 bytes, there are four memory channels, the interleave granularity is 1024 bytes, and the surface is stored in the tiled fashion in system memory system 107, where each tile is 4×4 pixels, then MIF 104 may inefficiently utilize system memory system 107 when retrieving pixel values for rendering by GPU 114 as part of the rasterization.

As discussed above, GPU 114 may store or retrieve pixel values into or from a particular memory address within memory system 107 by outputting a logical memory address associated with the particular memory address to MIF 104. MMU 105 included in MIF 104 may map the logical memory address to a physical memory address in memory system 107 and access the physical memory address in memory system 107 via one of memory controllers 106A and 106B to store or retrieve the pixel values.

Figure 5:
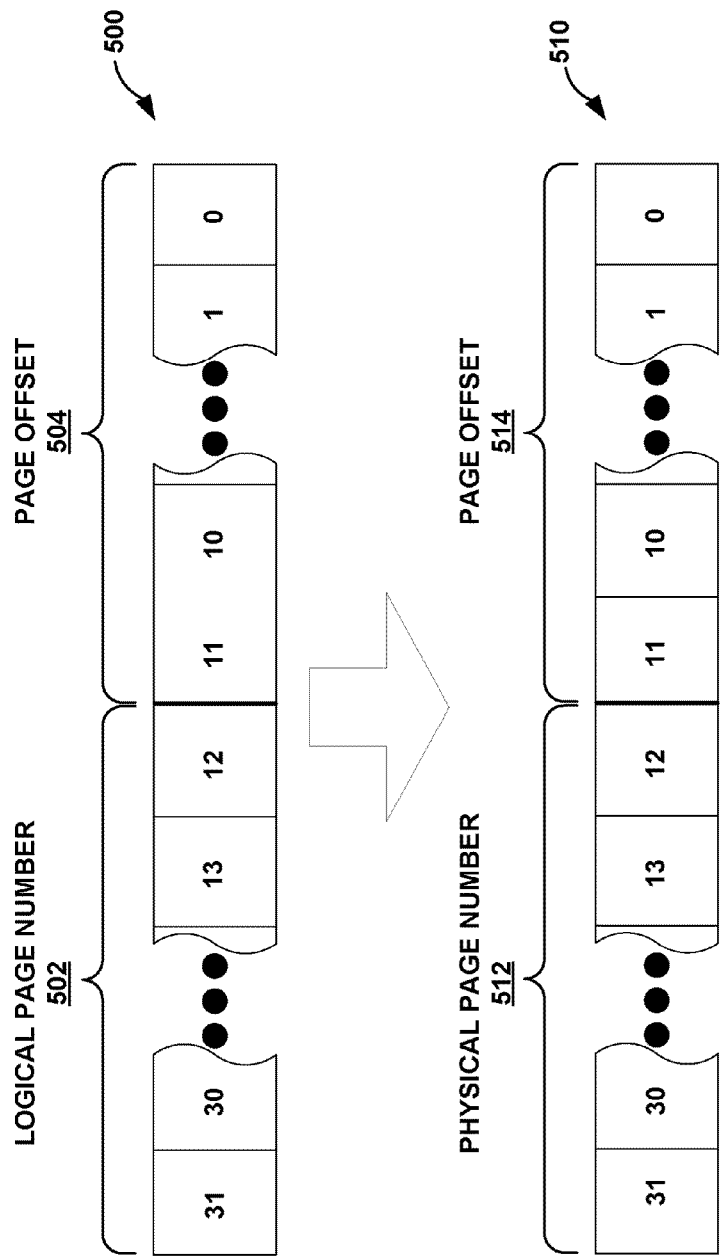
FIG. 5 is a block diagram illustrating an example technique for selecting a channel in a multi-channel memory system according to some aspects of the present disclosure.

In some examples, one or more bits of the logical memory address and/or one or more bits of the physical memory address where pixel values are to be stored may be used to improve the channel utilization of a multi-channel memory system. FIG. 5 is a block diagram illustrating an example mapping from a logical memory address to a physical memory address according to aspects of the disclosure. As shown in FIG. 5, channel selection may be based at least in part on the logical memory address and physical memory address that data is to be written to in the multi-channel memory system.

Logical memory address 500 of a memory system, such as memory system 107 shown in FIG. 1A, is made up of logical page number 502 and page offset 504. Logical page number 502 includes one or more leading bits of logical memory address 500, and page offset 504 includes one or more trailing bits of logical memory address 500.

In the example shown in FIG. 5, logical memory address 500 may be a 32-bit address, although it should be understood that logical memory address may be of any size, such as 8 bits, 16 bits, 40 bits, 52 bits, and the like. The logical memory address space may be divided up into pages. If, for example, the pages of the logical memory address space have a page size of 4096 bytes, then the trailing 12 bits (bit 0 to bit 11) of logical memory address 500 may be a page offset 504 to address each byte of a 4096-byte page. The leading 20 bits (bit 12 to bit 31) of logical memory address 500 may be a logical page number 502 that uniquely identifies each logical page in the logical memory address space.

Logical memory address 500 may be mapped to physical memory address 510 by MMU 105, so that data may be stored at physical memory address 510. Physical memory address 510 is made up of physical page number 512 and page offset 514. Mapping logical memory address 500 to physical memory address 510 may include mapping the logical page number 502 to a physical page number 512. In some examples, the memory management unit uses a translation lookaside buffer (TLB) in mapping logical memory address 500 to physical memory address 510, including mapping the logical page number 502 to the physical page number 512. In some other examples, any other suitable techniques may be used to map logical memory address 500 to physical memory address 510.

Mapping logical memory address 500 to physical memory address 510 may also include mapping page offset 504 of logical memory address 500 to page offset 514 of physical memory address 510. In some examples, the TLB is used to map page offset 504 to page offset 514. In some examples, page offset 514 of physical memory address 514 is the same as page offset 504 of logical memory address 500.

In the example shown in FIG. 5, physical memory address 510 may also be a 32-bit address, although it should be understood that physical memory address may be of any size, such as 8 bits, 16 bits, 64 bits, 128 bits, 256 bits, and the like. In some examples, physical memory address 510 may be of a different size than logical memory address 500. If a memory system has a page size of 4096 bytes, then the trailing 12 bits (bit 0 to bit 11) of physical memory address 510 may be a page offset 514 to address each byte of a 4096-byte page. The leading 20 bits (bit 12 to bit 31) of the physical memory address 510 may be a physical page number 512 that uniquely identifies each page in the physical memory address space. In some examples, each memory channel in the multi-channel memory system may have its own 32-bit physical memory address space.

As discussed above, it may be desirable to improve the load balancing between memory units and the overall channel utilization of a multi-channel memory system to optimize use of the bandwidth provided by the multi-channel memory system. Given the 32-bit logical memory address 500 shown in FIG. 5, one technique for improving the load balancing between memory units 108A and 108B of multi-channel memory system 107 may include, for each byte of pixel values making up surface 600, determining one of memory units 108A and 108B for storing that byte of pixel values based on one or more bits of page offset 504.

Figure 6:
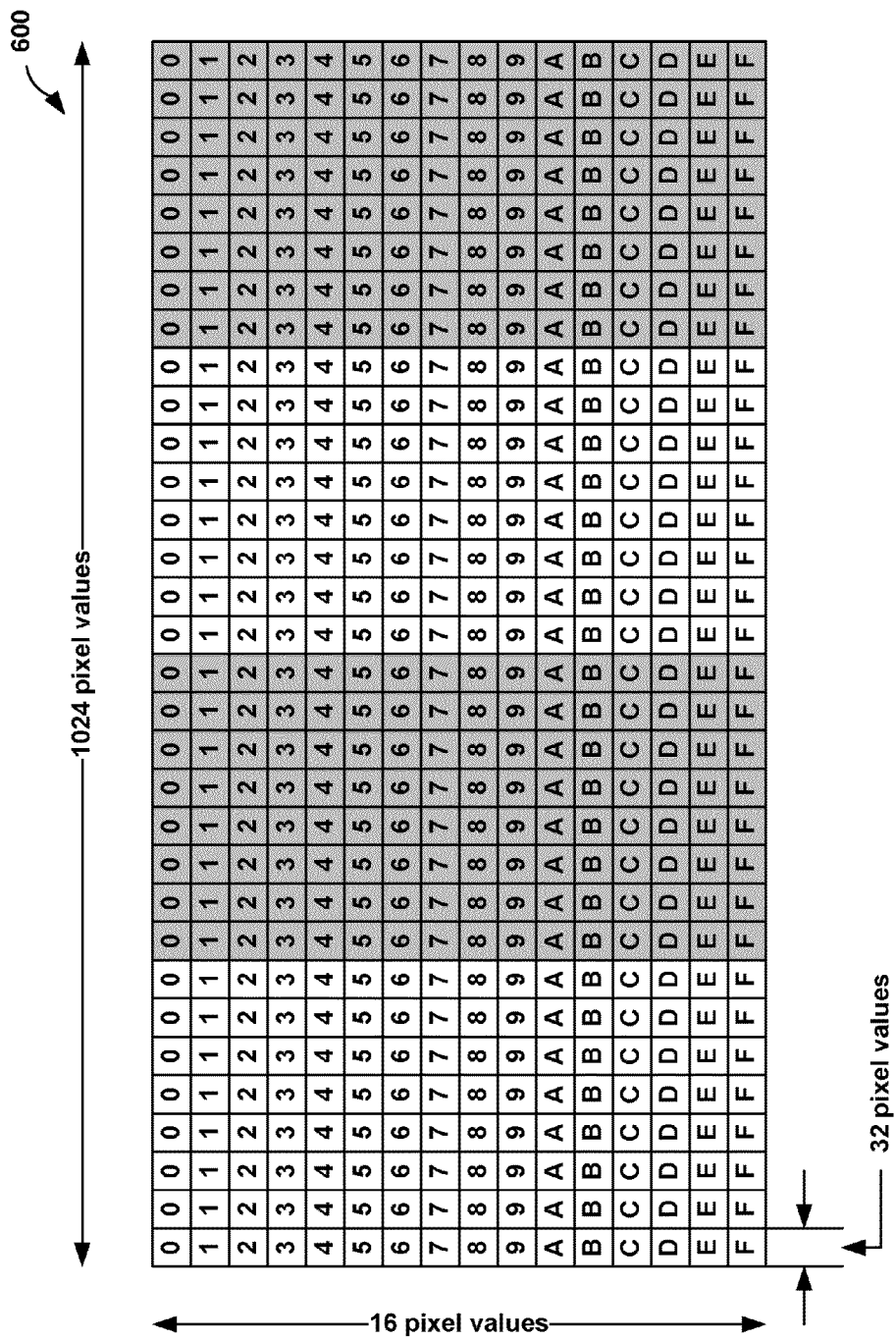
FIG. 6 is a graphical diagram illustrating an example of channel selection using one or more bits of a page offset according to some aspects of the disclosure.

FIG. 6 is a graphical diagram illustrating an example of channel selection using one or more bits of a page offset according to some aspects of the disclosure. As shown in FIG. 6, surface 600 may have a width (w) of 1024 pixel values and a height (h) of 16 pixel values, which may also be the dimensions of a display of computing device 100 because the dimensions of surface 600 may be the same as the dimensions of the display of device 100. Each column in surface 600 may represent 32 pixel values, and surface 600 having a width of 1024 pixel values may include 32 columns that each represent 32 pixel values (i.e. 1024 pixel values/32 columns equals 32 pixel values per column).

Each pixel value in surface 600 may include 32 bits of data. If each physical page of memory system 107 includes 4096 bytes with a memory interleave granularity of 1024 bytes, then each physical page may be divided into four portions of 1024 bytes. As shown in FIG. 1, in a dual-channel memory system 107 including a first memory channel and a second memory channel, if the first portion of the page resides in the first memory channel, then the second portion of the page resides in the second memory channel, the third portion of the page resides in the first memory channel, and the fourth portion of the page resides in the second memory channel.

The memory channel for storing each pixel value of surface 600 may be determined based on one or more bits of page offset 504. Such a determination may be performed by MIF 104 or MMU 105. The determination may also be made by GPU 114, processing unit 102, and/or any other processors in computing device 100. More specifically, the memory channel for storing each pixel value of surface 600 may be determined based on bit 10 of logical memory address 500. Because page offset 504 spans bits 0 to 11 of the 32-bit logical memory address 500, bit 10 of logical memory address 500 may be a bit included in page offset 504, and more specifically may be the second most significant bit of page offset 504. In the examples, page offset 504 may be identical to page offset 514, so that the second most significant of page offset 514 (i.e. bit 10 of physical memory address 510) may also be used instead of the second most significant bit of page offset 504. In some other examples, any other one or more bits of page offset 504 or page offset 514 may be used to determine the memory channel for storing each pixel value of surface 600. For brevity, although page offset 504 may be the same as page offset 514, aspects of this disclosure may only be described with reference to one or more bits of page offset 504.

Because a bit, such as bit 10 of logical memory address 500, is either 0 or 1, the memory channel for storing each pixel value of surface 600 may be determined using one or more bits of page offset 504, such as bit 10 of logical memory address 500, by associating a first memory channel (i.e., memory unit 108A and memory controller 106A) of a dual channel memory system with even, and associating a second memory channel (i.e., memory unit 108B and memory controller 106B) of the dual channel memory system with odd, so that a byte is stored in memory unit 108A if bit 10 of the corresponding logical memory address is 0, and the byte is stored in memory unit 108B if bit 10 of the corresponding logical memory address is 1.

The numerical values 0-F (in hexadecimal) in FIG. 6 may indicate on which page in system memory system 107 the pixel values for surface 600 are stored. The different colored backgrounds illustrate which one of memory unit 108A and 108B was used to store surface 600. For example, the white background of the pixel values in columns 1-8 and 17-24 (counting from left to right) of surface 600 may indicate that those pixel values are stored in memory unit 108A in system memory system 107 via memory controller 106A, and the gray background of the pixel values in columns 9-16 and 25-32 of surface 600 may indicate that those pixel values are stored in memory unit 108B in system memory system 107 via memory controller 106B.

Assuming that the logical memory address of the upper leftmost pixel value of surface 600 has a page offset 504 of 000000000000b, that the logical memory address of the next pixel value moving rightwards on surface 600 has a page offset of 000000000100b (offsetting the previous pixel value by 4 bytes because each pixel value includes 4 bytes), that the logical memory address of the next pixel value moving rightwards on surface 600 has a page offset of 000000001000b, that the logical memory address of the next pixel value moving rightwards on surface 600 has a page offset of 000000001100b, and so on, then the 10$^{th}$ bit of each logical memory address of pixel values of the leftmost 8 columns of pixels in the first row of surface 600 may be stored in the same first memory channel because the 10$^{th}$ bit of the logical memory addresses for each byte in those eight columns may be the same (i.e. 0). This is because the 8 columns includes 1024 bytes of pixel values (32 pixel values per column*4 bytes per column*8 columns=1024 bytes), and page offset 504 to address the last byte of the eighth pixel column may be 001111111111b (1023), meaning that the 10$^{th}$ bit of the logical memory address is still 0.

The logical memory address of the next pixel value moving rightwards on surface 600 from the last byte of the 8$^{th}$ column has a page offset 504 of 010000000000b. Because the 10$^{th}$ bit of the logical memory address is 1, the bytes of this pixel value may be stored in a second memory channel. Similarly, the next 8 columns (columns 9-16) of pixel values in surface 600 may also be stored in the same second memory channel because the page offset 504 to address the last byte of the 16$^{th}$ pixel column may be 011111111111b, meaning that the 10$^{th}$ bit of the logical memory address is still 1.

Similarly, pixel values in the next 8 columns (columns 17-24) of pixel values in surface 600 may be stored in the first memory channel because the page offsets 504 of bytes in those columns may range from 100000000000b to 101111111111b, and pixel values in the last 8 columns (columns 25-32) of pixel values in surface 600 may be stored in the second memory channel because the page offsets 504 of bytes in those columns may range from 110000000000b to 111111111111b.

In the example shown in FIG. 6, each column of surface 600 may include two 16×16 tiles, because the height of each column is 16 pixel values and the width of each column is 32 pixel values. Thus, as can be seen, if bit 10 of logical memory address 500 was used to determine a memory channel to store the pixel values of surface 600, then pixel values of each 16×16 display tile is stored entirely in memory unit 108A or entirely in memory unit 108B.

The channel load balance of memory system 107 storing pixel values of surface 600 may be quantified by calculating display tile channel utilization u=T/(nb), where T is the total number of pixel values of the display tile, n is the number of memory channels, and b is the maximum number of pixels of the display tile that are located in a single channel of the dual-channel memory system. Thus, for example surface 600, T may equal 16*16=256 (for the 16×16 display tiles), n may equal 2 (for the two channels of memory system 107), and b may equal 256 (because all of the pixel values of the display tile is located in a single channel), and display tile channel utilization u may equal 256/(2*256), which may equal 0.5, which may be considered suboptimal channel utilization because only half of the available memory bandwidth provided by memory controllers 106A and 106B is used when retrieving each display tile of surface 600 from memory system 107.

In some examples, channel utilization may be increased by introducing randomness in distributing data among the memory units of a multi-channel memory system. The mapping by MMU 105 between logical page number 502 to physical page number 512 may be considered a random process because there may be no logical relationship between logical page number 502 and physical page number 512. One example mapping between logical page number 502 to physical page number 512 is presented in the following table:

| Logical Page Number | Physical Page Number |
|---|---|
| 0x0 | 0x0029 |
| 0x1 | 0x4823 |
| 0x2 | 0x18be |
| 0x3 | 0x6784 |
| 0x4 | 0x4ae1 |
| 0x5 | 0x3d6c |
| 0x6 | 0x2cd6 |
| 0x7 | 0x72ae |
| 0x8 | 0x6952 |
| 0x9 | 0x5590 |
| 0xa | 0x1649 |
| 0xb | 0x6df1 |
| 0xc | 0x5af1 |
| 0xd | 0x41bb |
| 0xe | 0x26e9 |
| 0xf | 0x01eb |

To take advantage of this randomness in the channel selection process, channel selection for data to be stored in a multi-channel memory system may be based at least in part on one or more bits of the physical page number 512, to inject randomness into the channel selection process. Basing channel selection at least in part on one or more bits of the physical page number 512, may improve inter-page interleaving of the memory channels, thus improving the likelihood for a page of memory to reside in any one of the memory channels of the multi-channel memory system.

Figure 7A:
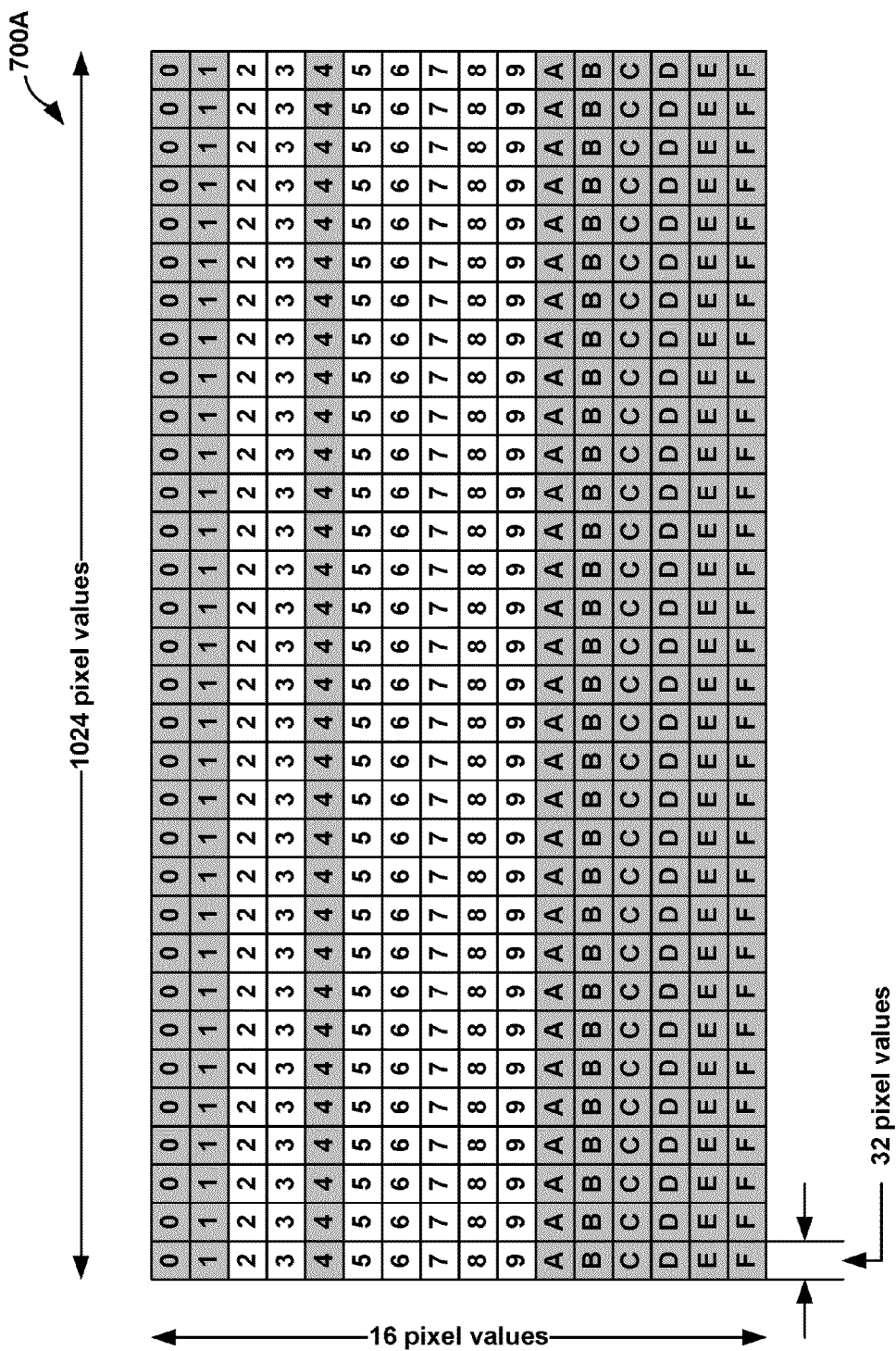
FIGS. 7A-7C are graphical diagrams illustrating examples of channel selection using one or more bits of a physical page number according to some aspects of the disclosure.
Figure 7B:
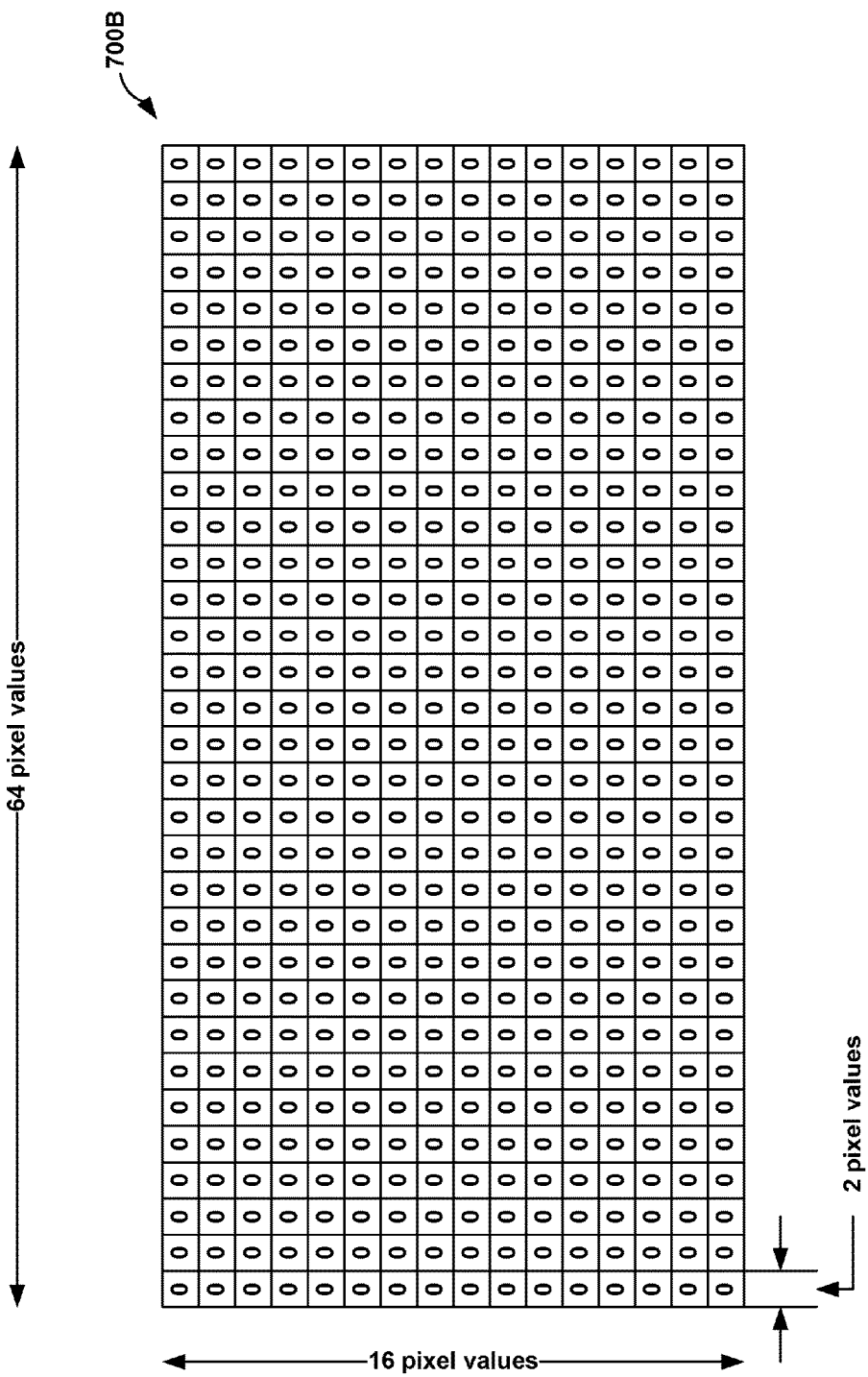
Figure 7C:
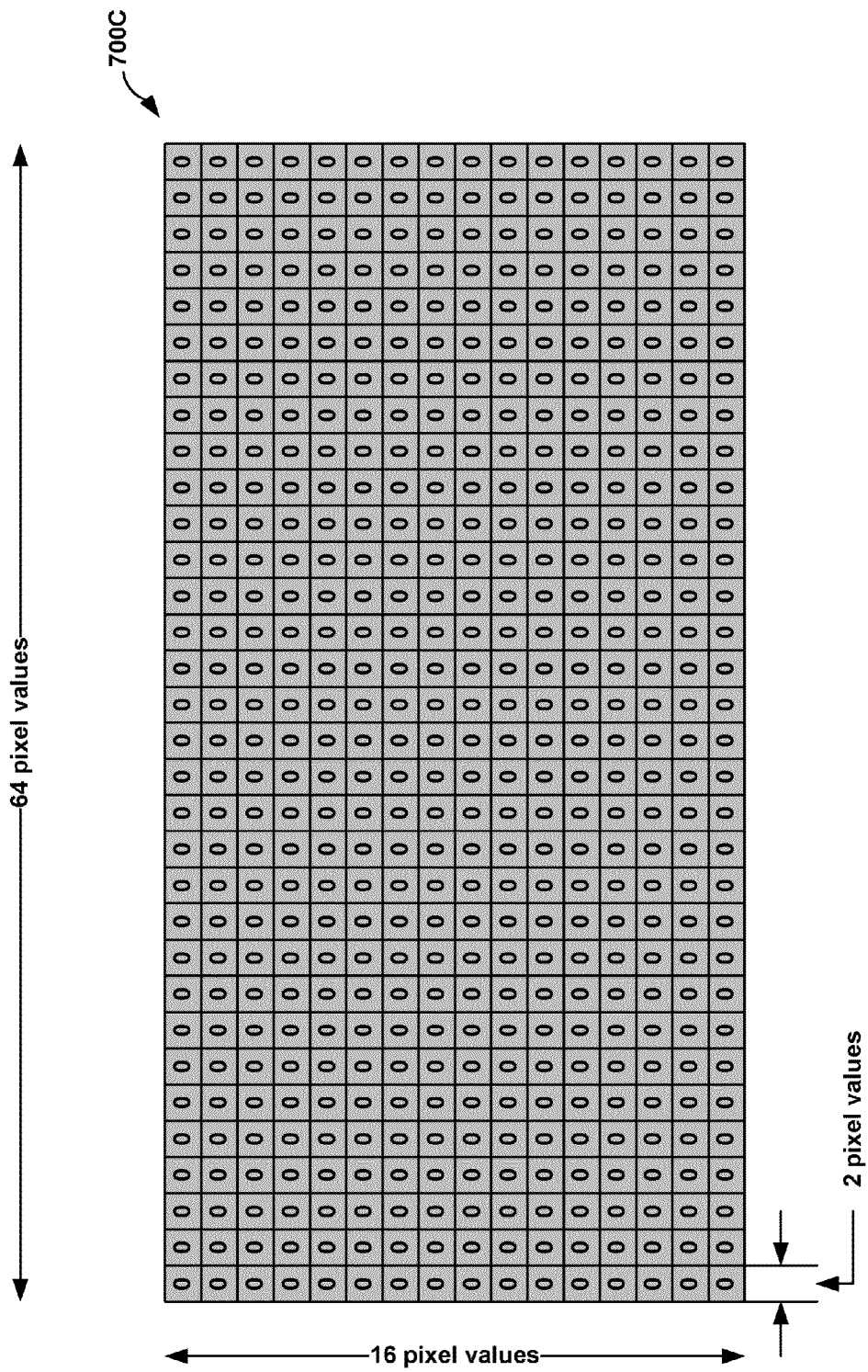

FIGS. 7A-7C are graphical diagrams illustrating examples of channel selection using one or more bits of a physical page number according to some aspects of the disclosure. As shown in FIG. 7A, 700A may have a width (w) of 1024 pixel values and a height (h) of 16 pixel values, which may also be the dimensions of a display of computing device 100 because the size of surface 700A may be the same as the size of the display of device 100. Each column in surface 700A may represent 32 pixel values, and surface 700A having a width of 1024 pixel values may include 32 columns that each represent 32 pixel values (i.e. 1024/32 equals 32).

Each pixel value in surface 700A may include 32 bits of data. If each physical page of memory system 107 includes 4096 bytes with a memory interleave granularity of 1024 bytes, then each physical page may be divided into four portions of 1024 bytes. As shown in FIG. 1, in a dual-channel memory system including a first memory channel and a second memory channel, if the first portion of the page resides in the first memory channel, then the second portion of the page resides in the second memory channel, the third portion of the page resides in the first memory channel, and the fourth portion of the page resides in the second memory channel.

The memory channel for storing each pixel value of surface 700A may be determined based on one or more bits of the physical page number 512. Such a determination may be performed by MIF 104, MMU 105, GPU 114, processing unit 102, and/or any other co-processors in computing device 100. More specifically, the memory channel for storing each pixel value of surface 600 may be determined based on bit 12 of physical memory address 510. Because physical page number spans bits 12-31 of the 32-bit physical memory address 510, as shown in FIG. 5, bit 12 of physical memory address 510 may be a bit of physical page number 512, more specifically the least significant bit of physical page number 512. In some other examples, any other one or more bits of physical page number 512 may be used to determine the memory channel for storing each pixel value of surface 700A.

Because a bit, such as bit 12 of physical memory address 500, is either 0 or 1, the memory channel for storing each pixel value of surface 700A may be determined using one or more bits of physical memory address 510, such as bit 12 of physical memory address 510, by associating a first memory channel (i.e., memory unit 108A and memory controller 106A) of a dual channel memory system with even, and associating a second memory channel (i.e., memory unit 108B and memory controller 106B) of the dual channel memory system with odd, so that a byte is stored in memory unit 108A if bit 12 of the corresponding physical memory address 510 is 0, and the byte is stored in memory unit 108B if bit 12 of the corresponding physical memory address 510 is 1.

The numerical values 0-F (in hexadecimal) in FIG. 7A indicate which page in system memory system 107 stores the pixel values for surface 700A. The different colored backgrounds illustrate which one of memory unit 108A and 108B was used to store surface 700A, where pixel values represented with a white background are denoted as being stored in memory unit 108A of dual-channel memory system 107, and pixel values represented with a gray background are denoted as being stored in memory unit 108B of dual-channel memory system 107.

As shown in FIG. 7A, the pixel values in rows 1-2, 5, and 11-16 (counting from top to bottom) of surface 700A (i.e., in the gray background) are stored in memory unit 108B in system memory system 107 via memory controller 106B, and the pixel values in rows 3-4 and 6-10 of surface 700A (i.e., in the white background) are stored in memory unit 108A in system memory system 107 via memory controller 106A.

As discussed above, because the mapping from logical page number 502 to physical page number 512 may essentially be considered a random process, about 50% of the resulting physical page number 512 may be even (meaning it has a least significant bit of 0), and about 50% of the resulting physical page number 512 may be odd (meaning it has a least significant bit of 1) Thus, one may expect that by using the least significant bit of physical page number 512 to determine the memory channel for storing pixel values, the pixel values may be evenly divided between the two memory channels of a dual-channel memory system. In the specific example shown in FIG. 7A, Each column of surface 700A may include two 16×16 tiles, because the height of each column is 16 pixel values and the width of each column is 32 pixel values. Thus, as can be seen, 112 of the pixel values (7/16 of 16×16) of each 16×16 display tile is stored entirely in memory unit 108A, and 144 of the pixel values (9/16 of 16×16) of each 16×16 display tile is stored entirely in memory unit 108B.

In the example illustrated in FIG. 7A, the channel utilization of any 16×16 display tile of surface 700A is u=T/nb=256/(2*(16*max(7, 9))=0.8889, where T is 16×16=256, n is 2, and b is 16*9. Thus, the channel utilization of display tiles of surface 700A in FIG. 7A increases by 77.78% compared to, for example, the 0.5 channel utilization of display tiles of surface 600 in FIG. 6.

In some situations, determining a memory unit based only on one or more bits of physical page number 512, such as bit 12 of the 32-bit physical memory address 510, may not produce optimal results. As shown in FIGS. 7B and 7C, surface 700B and surface 700C may have a width (w) of 64 pixel values and a height (h) of 16 pixel values, which may also be the dimensions of a display of device 100 because the dimensions of surface 700B and surface 700C may be the same as the dimensions of the display of device 100. Each column in surface 700B and surface 700C may represent 2 pixel values, and surface 700B having a width of 64 pixel values may include 32 columns that each represent 32 pixel values (i.e. 64/2 equals 32).

In the example illustrated in FIG. 7B, similar to FIG. 7A, GPU 114 may store pixel values of surface 700B based on bit 12 of the 32-bit physical memory address 510 (i.e. the least significant bit of physical page number 512). The different colored backgrounds illustrate which one of memory unit 108A and 108B was used to store surface 700B, where pixel values represented with a white background are denoted as being stored in memory unit 108A of dual-channel memory system 107, and pixel values represented with a gray background are denoted as being stored in memory unit 108B of dual-channel memory system 107.

If the least significant bit of physical page number 512 (bit 12 of the 32-bit physical memory address 510) is 0, then every pixel of surface 700B are stored in memory unit 108A in system memory system 107 via memory controller 106A, and no pixel values in surface 700B is stored in memory unit 108B in system memory system 107 via memory controller 106B because only the least significant bit of physical page number 512 is used to determine the memory unit 108A for story pixel values, and because the least significant bit of physical page number 512 being 0 is associated with storing pixel values in memory unit 108A.

In the example illustrated in FIG. 7B, the channel utilization of any 16×16 display tile of surface 700B is u=T/nb=256/(2*256)=0.5, where T is 16×16=256, n is 2, and b is 256. Thus, the channel utilization of display tiles of surface 700B is suboptimal compared to the channel utilization of display tiles of surface 700A.

In the example illustrated in FIG. 7C, similar to FIG. 7B, GPU 114 may store pixel values of surface 700C based on bit 12 of the 32-bit physical memory address 510 (i.e. the least significant bit of physical page number 512). The different colored backgrounds illustrate which one of memory unit 108A and 108B was used to store surface 700C, where pixel values represented with a white background are denoted as being stored in memory unit 108A of dual-channel memory system 107, and pixel values represented with a gray background are denoted as being stored in memory unit 108B of dual-channel memory system 107.

If the least significant bit of physical page number 512 (bit 12 of the 32-bit physical memory address 510) is 1, then every pixel of surface 700C is stored in memory unit 108B in system memory system 107 via memory controller 106B, and no pixel values in surface 700C is stored in memory unit 108A in system memory system 107 via memory controller 106A because only the least significant bit of physical page number 512 is used to determine the memory unit 108A for story pixel values, and because the least significant bit of physical page number 512 being 1 is associated with storing pixel values in memory unit 108B.

In the example illustrated in FIG. 7C, the channel utilization of any 16×16 display tile of surface 700C is u=T/nb=256/(2*256)=0.5, where T is 16×16=256, n is 2, and b is 256. Thus, the channel utilization of display tiles of surface 700C is also suboptimal compared to the channel utilization of display tiles of surface 700A.

In some examples, other bits or combination of one or more bits of physical page number 512 may be used to determine the memory unit for storing each byte of pixel values in surface 700. For example, the memory unit may be determined by performing a bitwise exclusive-OR on bit 13 and bit 12 of the 32-bit physical memory address 510, performing a bitwise exclusive-OR on bit 14 and bit 12 of the 32-bit physical memory address 510, performing a bitwise exclusive-OR on bit 15 and bit 12 of the 32-bit physical memory address 510, performing bitwise exclusive-ORs on bit 14, bit 13, and bit 12 of the 32-bit of physical memory address 510, performing bitwise exclusive-ORs on bit 15, bit 14, and bit 12 of the 32-bit physical memory address 510, or performing bitwise exclusive-ORs on bit 15, bit 13, and bit 12 of the 32-bit physical memory address 510. The bitwise exclusive-ORs may be performed by, for example, MIF 104, MMU 105, processing unit 102, and/or GPU 114.

Channel utilization may be further improved from determining a memory channel based on one or more bits of physical page number 512 by channel interleaving within pages, so that portions of a single page may be more likely to reside on multiple memory channels of the multi-channel memory system. Thus, in addition to one or more bits of the physical page number 512 channel selection may also be based at least in part on one or more bits of the page offset 514, thereby improving intra-page interleaving of the memory channels of the multi-channel memory system.

Therefore, logical bitwise operations may be performed by MIF 104, MMU 105, processing unit 102, GPU 114, and/or one or more other processors, on the one or more bits of the physical page number 512 and the one or more bits of the page offset 514 to select a memory unit. For example, for a dual-channel memory system, a bitwise exclusive-OR (XOR) operation may be performed on the one or more bits of the physical page number 512 together with the one or more bits of the page offset 514 to select a memory unit in the dual-channel memory system. In other examples, the logical bitwise operation performed on the bits may include bitwise AND, bitwise OR, bitwise NOT, bitwise NAND, bitwise NOR, or a combination of one or more logical bitwise operations. If page offset 514 of the physical memory address 510 is the same as page offset 504 of the logical page address 500, then the logical bitwise operation, such as the bitwise XOR operation, may be performed one or more bits of the physical page number 512 and one or more bits of the page offset 504.

In some examples, channel selection may be based at least in part on one or more least significant bits of the physical page number 512 and one or more most significant bits of page offset 504. For example, as shown in FIG. 2, a bitwise XOR operation may be performed together on bit 12 of the 32-bit physical memory address 510, which is the least significant bit of the physical page number 512, bit 11 of the 32-bit logical memory address 500, which is the most significant bit of the page offset 504, and bit 10 of the 32-bit logical memory address 500, which is the second most significant bit of the page offset 504, to select a memory unit in a dual-channel memory system. If page offset 514 of the physical memory address 510 is the same as page offset 504 of the logical page address 500, then a bitwise XOR operation may be performed together on bit 12 of the physical memory address 510, which is the least significant bit of the physical page number 512, bit 11 of the physical memory address 510, which is the most significant bit of the page offset 514, and bit 10 of the physical memory address 510, which is the second most significant bit of the page offset 514, to select a memory unit in a dual-channel memory system. The bitwise XOR of the three bits may result in a 1 if only one of the three bits is a 1 or if all three bits are 1s, and may result in a 0 if none of the three bits is a 1 or if exactly two the three bits are 1s.

For example, if the result of performing a bitwise XOR operation on bit 12 of physical memory address 510, bit 11 of logical memory address 500, and bit 10 of logical memory address 500 is 0, then data may be written by a memory controller of the determined memory unit, such as memory controller 106A shown in FIG. 1, to a first of the two memory channels, such as memory unit 108A shown in FIG. 1, in the dual-channel memory system. However, if the result of performing a bitwise XOR operation on bit 12 of physical memory address 510, bit 11 of logical memory address 500, and bit 10 of logical memory address 500 is 1, then data may be written by a memory controller of the determined memory unit, such as memory controller 106B shown in FIG. 1, to a second one of the two memory channels, such as memory unit 108B shown in FIG. 1, in the dual-channel memory system.

For multi-channel memory systems that include more than two memory channels, the memory channel may be determined based in part on multiple bits of the physical page number 512, where the number of bits required=ceil(log 2(number of channels)). For example, for a quad-channel memory system, two bits may be determined in order to select channels 0 to 3 of the quad-channel memory system, because two bits may be needed to denote (in binary from 0 to 3) each of the four channels of the quad-channel memory system. Thus, two bits of physical memory address 510 may each be bitwise logically operated (such as bitwise XORed) with one or more bits of the page offset 504 to determine two bits used to select a channel in the quad-channel memory system. Similarly, three bits of physical memory address 510 may each be bitwise logically operated (such as bitwise XORed) with one or more bits of the page offset 504 to determine three bits used to select a channel in an eight-channel memory system, and four bits of physical memory address 510 may each be bitwise logically operated (such as bitwise XORed) with one or more bits of the page offset 504 to determine four bits used to select a channel in a sixteen-channel memory system.

For the situation described above of a memory page size of 4096 bytes and given a 16-pixel high tile, using one or more least significant bits of the physical memory address 510 and one or more most significant bits of the page offset 504 for channel selection may yield an average channel utilization of 85% or higher for linear surfaces and 77% or higher for 4×4 tiled surfaces. Given a 32-pixel high tile, average channel utilization may be 89% or higher for linear surfaces and 81% or higher for 4×4 tiled surfaces.

Figure 8A:
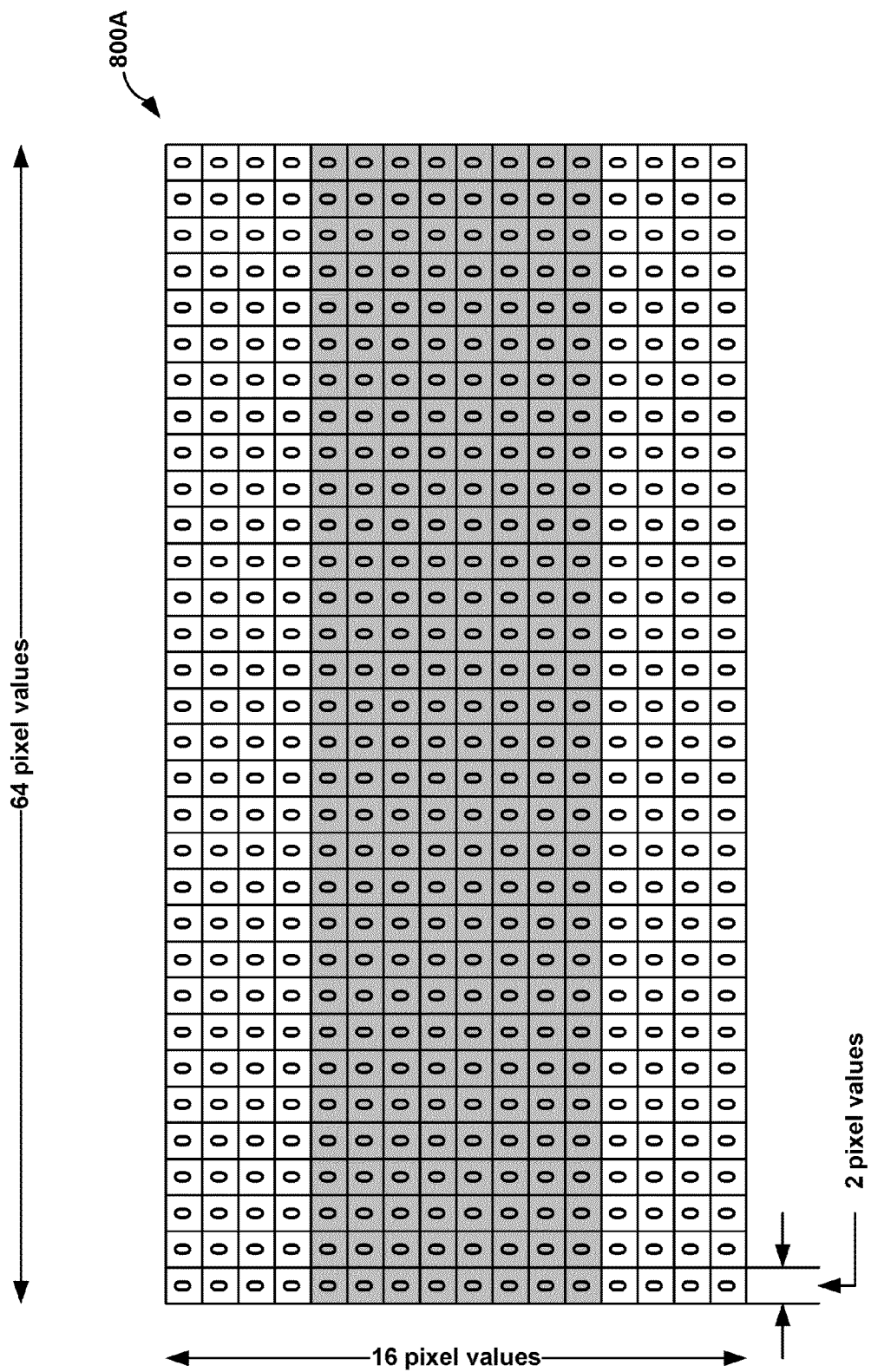
FIGS. 8A-8B are graphical diagrams illustrating examples of channel selection using one or more bits of a physical page number and one or more bits of a page offset according to some aspects of the disclosure.
Figure 8B:
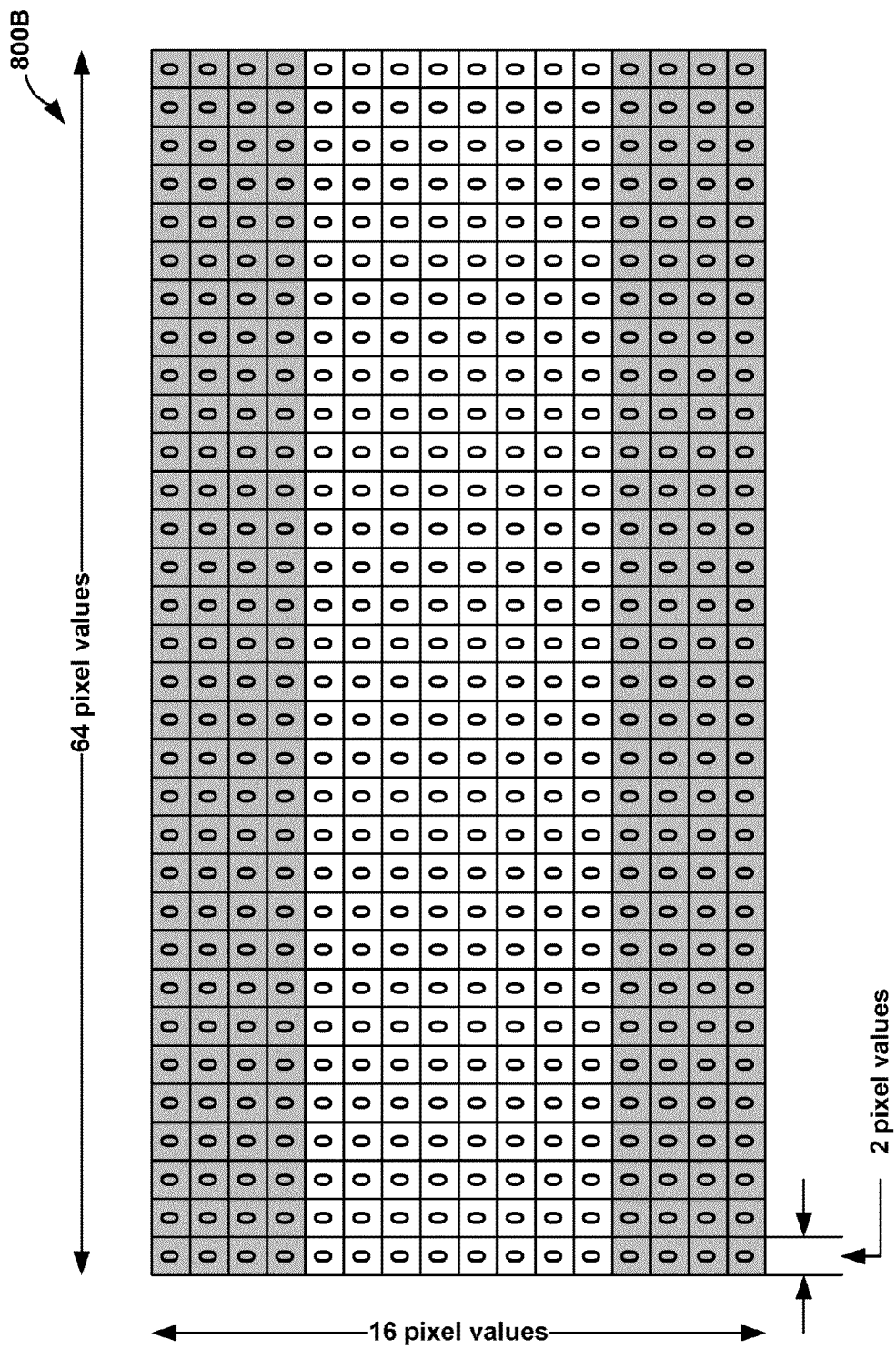

FIG. 8A-8B are graphical diagrams illustrating examples of channel selection using one or more bits of a physical page number and one or more bits of a page offset according to some aspects of the disclosure. As shown in FIGS. 8A and 8B, surface 800A and surface 800B may each have a width (w) of 64 pixel values and a height (h) of 16 pixel values, which may also be the dimensions of a display of device 100 because the dimensions of surface 800A and surface 800B may be the same as the dimensions of the display of device 100. Each column in surface 800A and surface 800B may represent 2 pixel values, and surface 800A and surface 800B having a width of 64 pixel values may each include 32 columns that each represent 32 pixel values (i.e. 64/2 equals 32). Surfaces 800A and 800B may be the same as surfaces 700B and 700C shown in FIGS. 7B and 7C, in order to illustrate techniques for improving channel utilization compared to the techniques shown in FIGS. 7B and 7C.

The memory unit for storing each byte of pixel values in surface 800A and surface 800B may be determined based on one or more bits of the physical page number 512 and one or more bits of the page offset 504. In the specific example shown in FIGS. 8A and 8B, bit 12 of the 32-bit physical memory address 510 may be logically-XORed with bit 11 of the 32-bit logical memory address 500 and bit 10 of the 32-bit logical memory address 500 to determine the memory unit for storing each byte of pixel values in surface 800A and in surface 800B. In the 32-bit physical memory address 510, bit 12 may be the least significant bit of physical page number 512. In the 32-bit logical memory address 500, bit 11 and bit 10 may be the most significant bit and second most significant bit of page offset 504.

In the example shown in FIG. 8A, the least significant bit of physical page number 512 (i.e. bit 12 of the 32-bit physical memory address 510) is 0. Because bit 12 of physical memory address 510 is 0, the result of bitwise XORing bit 12 of physical memory address 510 with bit 11 of logical memory address 500 and bit 10 of logical memory address 500 is the same as the result from bitwise XORing bit 11 of logical memory address 500 and bit 10 of logical memory address 500.

Assuming that the first pixel value of surface 800A has a page offset 504 of 00000000000b, rows 1-4 (counting from top to bottom) of surface 800A may have page offsets 504 that span 00000000000b to 001111111111b. Because the most significant bit and the second most significant bit of page offsets 504 for these rows are always 0, the bitwise XORing these two bits may always result in 0. Thus, the pixel values for rows 1-4 of surface 800A are stored in memory unit 108A via memory controller 106A.

Assuming that the first pixel value of the 5$^{th}$ row of surface 800A has a page offset 504 of 01000000000b, rows 5-8 of surface 800A may have page offsets 504 that span 01000000000b to 011111111111b. Because the most significant bit and the second most significant bit of page offsets 504 for these rows are always 0 and 1, respectively, the bitwise XORing these two bits may always result in 1. Thus, the pixel values for rows 5-8 of surface 800A are stored in memory unit 108B via memory controller 106B.

Assuming that the first pixel value of the 9$^{th}$ row of surface 800A has a page offset 504 of 10000000000b, rows 9-12 of surface 800A may have page offsets 504 that span 10000000000b to 101111111111b. Because the most significant bit and the second most significant bit of page offsets 504 for these rows are always 1 and 0, respectively, the bitwise XORing these two bits may always result in 1. Thus, the pixel values for rows 9-12 of surface 800A are stored in memory unit 108B via memory controller 106B.

Assuming that the first pixel value of the 13$^{th}$ row of surface 800A has a page offset 504 of 11000000000b, rows 13-16 of surface 800A may have page offsets 504 that span 11000000000b to 111111111111b. Because the most significant bit and the second most significant bit of page offsets 504 for these rows are always 1 and 1, respectively, the bitwise XORing these two bits may always result in 0. Thus, the pixel values for rows 13-16 of surface 800A are stored in memory unit 108A via memory controller 106A.

As shown in FIG. 8A, the different colored backgrounds illustrate which one of memory unit 108A and 108B was used to store surface 800A, where pixel values represented with a white background are denoted as being stored in memory unit 108A of dual-channel memory system 107, and pixel values represented with a gray background are denoted as being stored in memory unit 108B of dual-channel memory system 107. If the least significant bit of physical page number 512 (bit 12 of physical memory address 510) is 0, then the pixel values in rows 1-4 and 13-16 (counting from top to bottom) of surface 800A (i.e., in the white background) are stored in memory unit 108A in system memory system 107 via memory controller 106A, and the pixel values in rows 5-12 of surface 800A (i.e., in the gray background) are stored in memory unit 108B in system memory system 107 via memory controller 106B. Each eight column of surface 800A may include a 16×16 tile, because the height of each column is 16 pixel values and the width of each column is 2 pixel values. Thus, as can be seen, 128 of the pixel values (½ of 16×16) of each 16×16 display tile is stored entirely in memory unit 108A, and 128 of the pixel values (½ of 16×16) of each 16×16 display tile is stored entirely in memory unit 108B.

In the example illustrated in FIG. 8A, the channel utilization of any 16×16 display tile of surface 800A is u=T/nb=256/(2*128)=1.0, where T is 16×16=256, n is 2, and b is 128. Thus, the channel utilization of display tiles of surface 800A is improved compared to the channel utilization of display tiles of surface 700B.

In the example shown in FIG. 8B, the least significant bit of physical page number 512 (i.e. bit 12 of the 32-bit physical memory address 510) is 1. Because bit 12 of physical memory address 510 is 1, the result of bitwise XORing bit 12 of physical memory address 510 with bit 11 of logical memory address 500 and bit 10 of logical memory address 500 results in 1 only if bit 11 of logical memory address 500 and bit 10 of logical memory address 500 are both 0s, or if bit 11 of logical memory address 500 and bit 10 of logical memory address 500 are both 1s.

Assuming that the first pixel value of surface 800A has a page offset 504 of 00000000000b, rows 1-4 (counting from top to bottom) of surface 800A may have page offsets 504 that span 00000000000b to 001111111111b. Because the most significant bit and the second most significant bit of page offsets 504 for these rows are always 0, the bitwise XORing these two bits may always result in 1. Thus, the pixel values for rows 1-4 of surface 800A are stored in memory unit 108B via memory controller 106B.

Assuming that the first pixel value of the 5$^{th}$ row of surface 800A has a page offset 504 of 01000000000b, rows 5-8 of surface 800A may have page offsets 504 that span 01000000000b to 011111111111b. Because the most significant bit and the second most significant bit of page offsets 504 for these rows are always 0 and 1, respectively, the bitwise XORing these two bits and a 1 may always result in 0. Thus, the pixel values for rows 5-8 of surface 800A are stored in memory unit 108A via memory controller 106A.

Assuming that the first pixel value of the 9$^{th}$ row of surface 800A has a page offset 504 of 10000000000b, rows 9-12 of surface 800A may have page offsets 504 that span 10000000000b to 101111111111b. Because the most significant bit and the second most significant bit of page offsets 504 for these rows are always 1 and 0, respectively, the bitwise XORing these two bits with a 1 may always result in 0. Thus, the pixel values for rows 9-12 of surface 800A are stored in memory unit 108A via memory controller 106A.

Assuming that the first pixel value of the 13$^{th}$ row of surface 800A has a page offset 504 of 11000000000b, rows 13-16 of surface 800A may have page offsets 504 that span 11000000000b to 111111111111b. Because the most significant bit and the second most significant bit of page offsets 504 for these rows are always 1 and 1, respectively, the bitwise XORing these two bits with 1 may always result in 1. Thus, the pixel values for rows 13-16 of surface 800A are stored in memory unit 108B via memory controller 106B.

As shown in FIG. 8B, the different colored backgrounds illustrate which one of memory unit 108A and 108B was used to store surface 800B, where pixel values represented with a white background are denoted as being stored in memory unit 108A of dual-channel memory system 107, and pixel values represented with a gray background are denoted as being stored in memory unit 108B of dual-channel memory system 107. If the least significant bit of physical page number 512 (bit 12 of physical memory address 510) is odd, then the pixel values in rows 5-12 (counting from top to bottom) of surface 800B (i.e., in the white background) are stored in memory unit 108A in system memory system 107 via memory controller 106A, and the pixel values in rows 1-4 and 13-16 of surface 800B (i.e., in the gray background) are stored in memory unit 108B in system memory system 107 via memory controller 106B. Each eight column of surface 800B may include a 16×16 tile, because the height of each column is 16 pixel values and the width of each column is 2 pixel values. Thus, as can be seen, 128 of the pixel values (½ of 16×16) of each 16×16 display tile is stored entirely in memory unit 108A, and 128 of the pixel values (½ of 16×16) of each 16×16 display tile is stored entirely in memory unit 108B.

In the example illustrated in FIG. 8B, the channel utilization of any 16×16 display tile of surface 800B is u=T/nb=256/(2*128)=1.0, where T is 16×16=256, n is 2, and b is 128. Thus, the channel utilization of display tiles of surface 800B is improved compared to the channel utilization of display tiles of surface 700B.

The average channel utilization may be computed independent of the scheme that uses bits of the physical page number to select the memory unit. Instead, the average channel utilization may depend on the number of pages in a display tile pixel column:

| Number of pages in a display tile pixel column | Mean channel utilization |
|---|---|
| 1 | 0.5 |
| 2 | 0.75 |
| 4 | 0.7708 |
| 8 | 0.8089 |
| 16 | 0.8491 |
| 32 | 0.8847 |
| 64 | 0.9137 |

For example, if there are two memory pages in a display tile pixel column, then there are four cases each with equal chances of occurring:
Case 1:
bit 12 of physical memory address of the upper page: 0
bit 12 of physical memory address of the lower page: 0
channel utilization: 0.5
Case 2:
bit 12 of physical memory address of the upper page: 0
bit 12 of physical memory address of the lower page: 1
channel utilization: 1.0
Case 3:
bit 12 of physical memory address of the upper page: 1
bit 12 of physical memory address of the lower page: 0
channel utilization: 1.0
Case 4:
bit 12 of physical memory address of the upper page: 1
bit 12 of physical memory address of the lower page: 1
channel utilization: 0.5

Thus, the mean channel utilization may equal 0.25*0.5+0.25*1.0+0.25*1.0+0.25*0.5=0.75, which matches the mean channel utilization in the table above for two pages. Mean channel utilization can be calculated as follows:

```
mean = 0;
for(i=0; i<=pages; i++)
{
    mean += comb(pages, i) * channel_util(pages-i,
i)* probability;
}
``` where mean is the mean channel utilization to be computed, pages is the number of pages in a display tile pixel column, comb(n, k) returns the number of k-combinations from n elements, channel_util( ) returns channel utilization of the combination, and probability is 1.0/(1<< pages).

The number of pages in a display tile pixel column can be computed as:

pages=screenTileHeight/pageHeight;

where screenTileHeight is the height of the display tile in pixels, and pageHeight is the height of an MMU page in pixels.

pageHeight can be computed as pageHeight=max(pageSize/stride, 1)*surfaceTileHeight;
where pageSize is the MMU page size in bytes, surfaceTileHeight is the height of surface tile in pixels, and stride is the number of bytes to store one row of tiles.

Given a surface width in pixels of w, a pixel size of b, and a surface tile height in pixels of v, surface stride may be defined as stride=b*w*v. For a linear surface, v is 1. For example, stride is 128 bytes for a linear surface having a width of 32 pixels and a pixel size of 4 bytes because stride=4*32*1. In another example, stride is 512 bytes for a 4×4 tiled surface having a width of 32 pixels and a pixel size of 4 bytes because stride=4*32*4.

For a 4×4 tiled surface with a surface width of 512, an MMU page size of 4096 bytes, a pixel size of 4 bytes per pixel, and 16×16 display tiles, stride=4*512*4=8192, pageHeight=max(4096/8192, 1)*4=4, and pages=16/4=4. Based on the above table, the mean channel utilization for this example is 0.7708.

For a linear surface with a surface width of 2048, an MMU page size of 4096 bytes, a pixel size of 4 bytes per pixel, and display tile height of 32, stride=4*2048*1=8192, pageHeight=max(4096/8192, 1)*1=1, and pages=32/1=32. Based on the above table, the mean channel utilization for this example is 0.8847.

Figure 9:
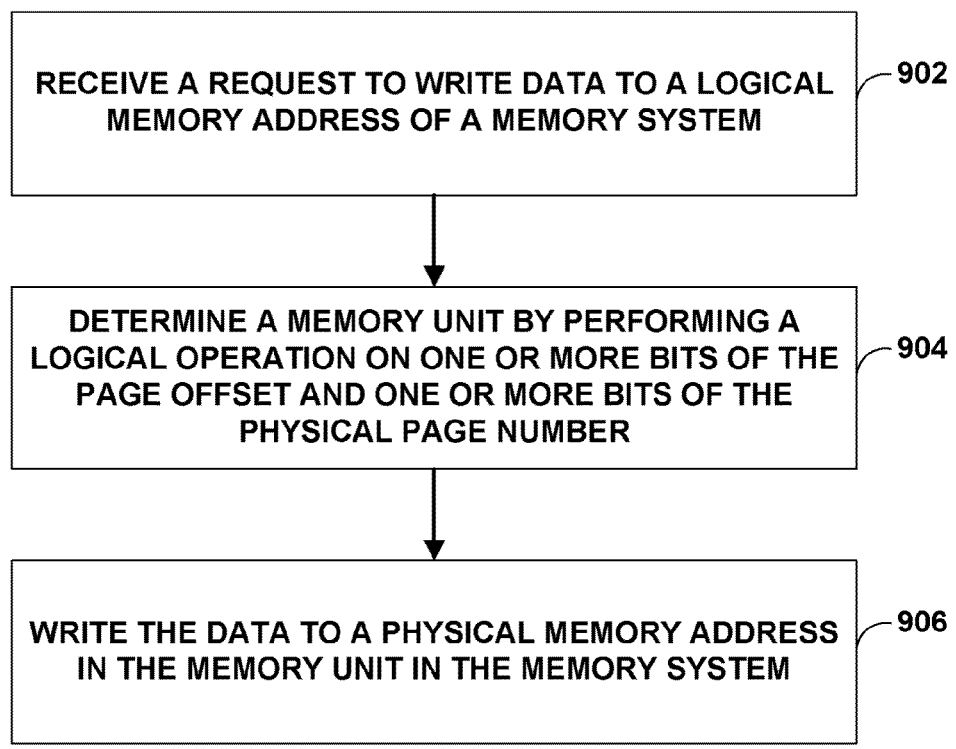
FIG. 9 is a flowchart illustrating an example method for determining a memory channel to write data according to some aspects of the present disclosure.

FIG. 9 is a flowchart illustrating an example method for determining a memory channel to write data according to some aspects of the present disclosure. As shown in FIG. 9, the MIF 104 may receive a request to write data to a logical memory address of a memory system in a computing device, the logical memory address including a logical page number and a page offset, wherein the logical page number maps to a physical page number and the logical memory address maps to a physical memory address (902). MIF 104, MMU 105, processing unit 102, and/or GPU 114 may determine a memory unit out of a plurality of memory units in the memory system by performing a logical operation on one or more bits of the page offset and one or more bits of the physical page number (904). Memory controller 106A or 106B may write the data to a physical memory address in the determined memory unit 108A or 108B in memory system 107 (906).

In some examples, the one or more bits of the page offset may include one or more most significant bits of the page offset. In some examples, the one or more bits of the physical page number may include one or more least significant bits of the physical page number. In some examples, the logical operation may include a bitwise exclusive OR operation. In some examples, the one or more bits of the page offset may include a most significant bit of the page offset and a second most significant bit of the page offset, and the one or more bits of the physical page number may include a least significant bit of the physical page number.

Figure 10:
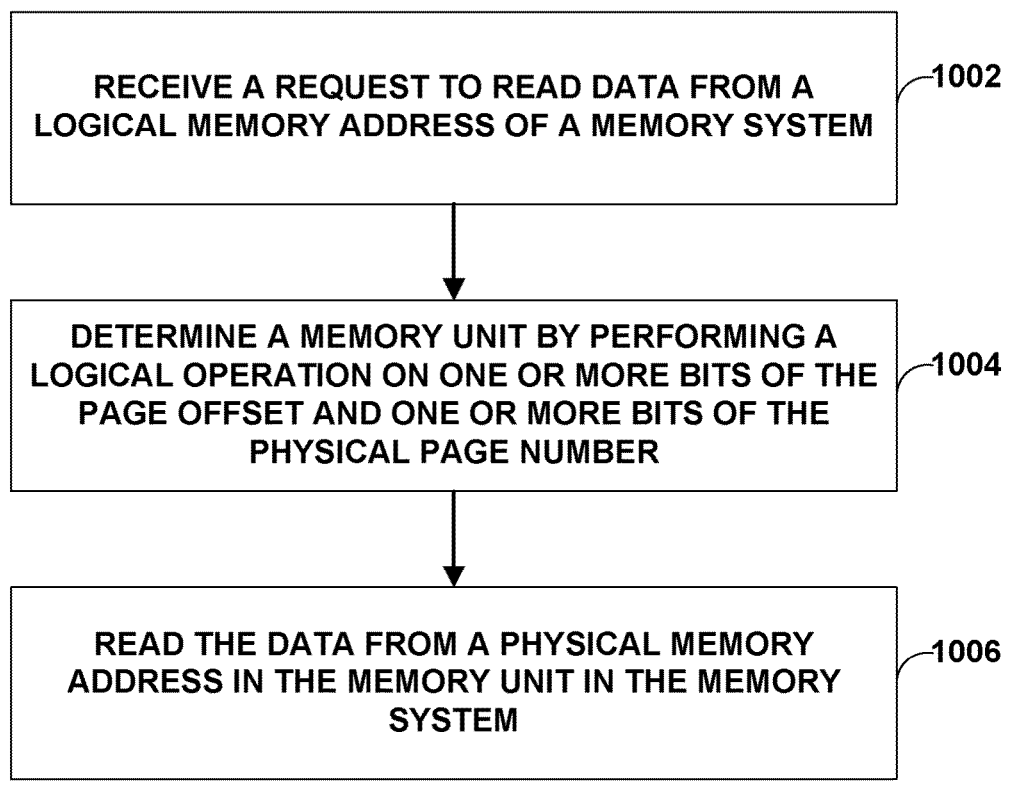
FIG. 10 is a flowchart illustrating an example method for determining a memory channel from which to read data according to some aspects of the present disclosure.

The process for reading data from the multi-channel memory system may be similar to the process for writing data to the multi-channel memory system. FIG. 10 is a flowchart illustrating an example method for determining a memory channel from which to read data according to some aspects of the present disclosure. As shown in FIG. 10, the MIF 104 may receive a request to read data from a logical memory address of a memory system in a computing device, the logical memory address including a logical page number and a page offset, wherein the logical page number maps to a physical page number and the logical memory address maps to a physical memory address (1002). MIF 104, MMU 105, processing unit 102, and/or GPU 114 may determine a memory unit out of a plurality of memory units in the memory system by performing a logical operation on one or more bits of the page offset and one or more bits of the physical page number (1004). Memory controller 106A or 106B may read the data from a physical memory address in the determined memory unit 108A or 108B in memory system 107 (1006).

In some examples, the one or more bits of the page offset may include one or more most significant bits of the page offset. In some examples, the one or more bits of the physical page number may include one or more least significant bits of the physical page number. In some examples, the logical operation may include a bitwise exclusive OR operation. In some examples, the one or more bits of the page offset may include a most significant bit of the page offset and a second most significant bit of the page offset, and the one or more bits of the physical page number may include a least significant bit of the physical page number.

Figure 11:
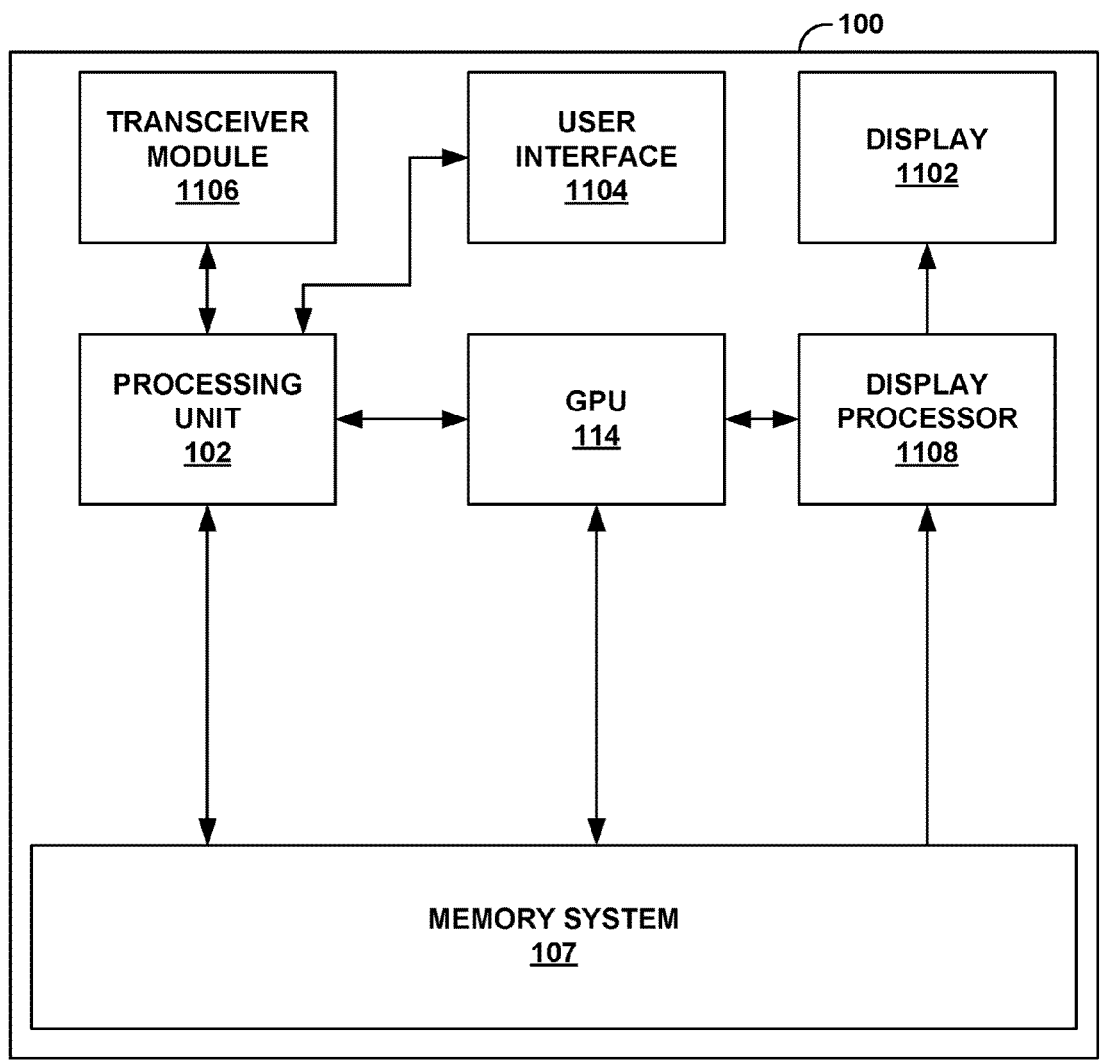
FIG. 11 is a block diagram illustrating an example computing device according to aspects of the disclosure.

FIG. 11 is a block diagram illustrating an example computing device according to aspects of the disclosure. For example, FIG. 10 may show device 100 of FIG. 1A in greater detail. For purposes of brevity, only the components of device 100 that are illustrated in FIG. 10, but not illustrated in FIG. 1A are described in detail.

As shown in FIG. 11, device 100 may include display 1102, processing unit 102, GPU 114, memory system 107, display processor 1108, transceiver module 1106, and user interface 1104. Processing unit 102, GPU 114, and memory system 107, as shown in FIG. 11, may be substantially similar to those shown in FIG. 1A. Furthermore, transceiver module 1106 and display processor 1108 may both be part of IC 101, may both be external to IC 101, or one may be part of IC 101 and the other external to IC 101.

Device 100 may include additional modules or units not shown in FIG. 10 for purposes of clarity. For example, device 100 may include a speaker and a microphone, neither of which are shown in FIG. 11, to effectuate telephonic communications in examples where device 100 is a mobile wireless telephone or a speaker where device 100 is a media player. Device 100 may also include a video camera. Furthermore, the various modules and units shown in device 100 may not be necessary in every example of device 100. For example, user interface 1104 and display 1102 may be external to device 100 in examples where device 100 is a desktop computer or other device that is equipped to interface with an external user interface or display.

Examples of user interface 1104 include, but are not limited to, a trackball, a mouse, a keyboard, and other types of input devices. User interface 1104 may also be a touch screen and may be incorporated as a part of display 1102. Transceiver module 1106 may include circuitry to allow wireless or wired communication between device 100 and another device or a network. Transceiver module 1106 may include modulators, demodulators, amplifiers and other such circuitry for wired or wireless communication.

Display 1102 may the display of device 100 that displays the image content generated by GPU 114. For example, during the rasterization process, GPU 114 may divide display 1102 to the display tiles, and render the image into each one of the display tiles. Display 1102 may be a liquid crystal display (LCD), an organic light emitting diode display (OLED), a cathode ray tube (CRT) display, a plasma display, or another type of display device.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method, comprising:
receiving a request to write data to a logical memory address of a memory system in a computing device, the logical memory address including a logical page number and a page offset, wherein the logical page number maps to a physical page number and the logical memory address maps to a physical memory address;
determining, by the computing device, a memory unit out of a plurality of memory units in the memory system by performing a bitwise logical operation on one or more bits of the page offset with one or more bits of the physical page number, wherein the bitwise logical operation includes at least one of: a bitwise exclusive OR operation, a bitwise AND operation, a bitwise NOT operation, a bitwise NAND operation, or a bitwise NOR operation; and
writing the data to a physical memory address in the determined memory unit in the memory system.

2. The method of claim 1, wherein the one or more bits of the page offset includes one or more most significant bits of the page offset.

3. The method of claim 2, wherein the one or more bits of the physical page number includes one or more least significant bits of the physical page number.

4. The method of claim 3, wherein:
the one or more bits of the page offset includes a most significant bit of the page offset and a second most significant bit of the page offset; and
the one or more bits of the physical page number include a least significant bit of the physical page number.

5. A non-transitory computer-readable storage medium comprising instructions that, when executed on at least one processor, causes the at least one processor to perform operations comprising:
receiving a request to write data to a logical memory address of a memory system in a computing device, the logical memory address including a logical page number and a page offset, wherein the logical page number maps to a physical page number and the logical memory address maps to a physical memory address;
determining, by the computing device, a memory unit out of a plurality of memory units in the memory system by performing a bitwise logical operation on one or more bits of the page offset with one or more bits of the physical page number, wherein the bitwise logical operation includes at least one of: a bitwise exclusive OR operation, a bitwise AND operation, a bitwise NOT operation, a bitwise NAND operation, or a bitwise NOR operation; and
writing the data to a physical memory address in the determined memory unit in the memory system.

6. The non-transitory computer-readable storage medium of claim 5, wherein the one or more bits of the page offset includes one or more most significant bits of the page offset.

7. The non-transitory computer-readable storage medium of claim 6, wherein the one or more bits of the physical page number includes one or more least significant bits of the physical page number.

8. The non-transitory computer-readable storage medium of claim 7, wherein:
the one or more bits of the page offset includes a most significant bit of the page offset and a second most significant bit of the page offset; and
the one or more bits of physical page number include a least significant bit of the physical page number.

9. A computing device comprising:
a processor;
a memory system;
a memory interface unit configured to receive a request from the processor to write data to a logical memory address of the memory system, the logical memory address including a logical page number and a page offset, wherein the logical page number maps to a physical page number and the logical memory address maps to a physical memory address;
a memory management unit configured to determine a memory unit out of a plurality of memory units in the memory system by performing a bitwise logical operation on one or more bits of the page offset with one or more bits of the physical page number, wherein the bitwise logical operation includes at least one of: a bitwise exclusive OR operation, a bitwise AND operation, a bitwise NOT operation, a bitwise NAND operation, or a bitwise NOR operation; and
a memory controller configured to write the data to the determined memory unit in the memory system.

10. The computing device of claim 9, wherein the one or more bits of the page offset includes one or more most significant bits of the page offset.

11. The computing device of claim 10, wherein the one or more bits of the physical page number includes one or more least significant bits of the physical page number.

12. The computing device of claim 11, wherein:
the one or more bits of the page offset includes a most significant bit of the page offset and a second most significant bit of the page offset; and
the one or more bits of the physical page number include a least significant bit of the physical page number.

13. The computing device of claim 9, wherein the processor comprises a graphics processing unit.

14. An integrated circuit comprising:
a processor;
a memory interface unit configured to receive a request from the processor to write data to a logical memory address of a memory system, the logical memory address including a logical page number and a page offset, wherein the logical page number maps to a physical page number and the logical memory address maps to a physical memory address;
a memory management unit configured to determine a memory unit out of a plurality of memory units in the memory system by performing a bitwise logical operation on one or more bits of the page offset with one or more bits of the physical page number, wherein the bitwise logical operation includes at least one of: a bitwise exclusive OR operation, a bitwise AND operation, a bitwise NOT operation, a bitwise NAND operation, or a bitwise NOR operation; and
a memory controller configured to write the data to the determined memory unit in the memory system.

15. The integrated circuit of claim 14, wherein the one or more bits of the page offset includes one or more most significant bits of the page offset.

16. The integrated circuit of claim 15, wherein the one or more bits of the physical page number includes one or more least significant bits of the physical page number.

17. The integrated circuit of claim 16, wherein:
the one or more bits of the page offset includes a most significant bit of the page offset and a second most significant bit of the page offset; and
the one or more bits of the physical page number include a least significant bit of the physical page number.

18. The integrated circuit of claim 14, wherein the processor comprises a graphics processing unit.

19. An apparatus, comprising:
means for receiving a request to write data to a logical memory address of a memory system in a computing device, the logical memory address including a logical page number and a page offset, wherein the logical page number maps to a physical page number and the logical memory address maps to a physical memory address;
means for determining, by the computing device, a memory unit out of a plurality of memory units in the memory system by performing a bitwise logical operation on one or more bits of the page offset with one or more bits of the physical page number, wherein the bitwise logical operation includes at least one of: a bitwise exclusive OR operation, a bitwise AND operation, a bitwise NOT operation, a bitwise NAND operation, or a bitwise NOR operation; and
means for writing the data to a physical memory address in the determined memory unit in the memory system.

20. The apparatus of claim 19, wherein the one or more bits of the page offset includes one or more most significant bits of the page offset.

21. The apparatus of claim 20, wherein the one or more bits of the physical page number includes one or more least significant bits of the physical page number.

22. The apparatus of claim 21, wherein:
the one or more bits of the page offset includes a most significant bit of the page offset and a second most significant bit of the page offset; and
the one or more bits of the physical page number include a least significant bit of the physical page number.

23. A method comprising:
receiving a request to read data from a logical memory address of a memory system in a computing device, the logical memory address including a logical page number and a page offset, wherein the logical page number maps to a physical page number and the logical memory address maps to a physical memory address;
determining, by the computing device, a memory unit out of a plurality of memory units in the memory system by performing a bitwise logical operation on one or more bits of the page offset with one or more bits of the physical page number, wherein the bitwise logical operation includes at least one of: a bitwise exclusive OR operation, a bitwise AND operation, a bitwise NOT operation, a bitwise NAND operation, or a bitwise NOR operation; and
reading the data from a physical memory address in the determined memory unit in the memory system.

24. The method of claim 23, wherein the one or more bits of the page offset includes one or more most significant bits of the page offset.

25. The method of claim 24, wherein the one or more bits of the physical page number includes one or more least significant bits of the physical page number.

26. The method of claim 25, wherein:
the one or more bits of the page offset includes a most significant bit of the page offset and a second most significant bit of the page offset; and
the one or more bits of the physical page number include a least significant bit of the physical page number.

* * * * *